United States Patent [19]
Shimura

[11] Patent Number: 5,949,569
[45] Date of Patent: Sep. 7, 1999

[54] PROJECTION DISPLAY APPARATUS AND SPATIAL LIGHT MODULATION DEVICE APPLIED TO THE SAME

[75] Inventor: Kei Shimura, Yokohama, Japan

[73] Assignee: Kabushiki Kaisha Toshiba, Kawasaki, Japan

[21] Appl. No.: 08/795,867

[22] Filed: Feb. 7, 1997

[30] Foreign Application Priority Data

Feb. 9, 1996 [JP] Japan .................................. 8-024091
Jul. 15, 1996 [JP] Japan .................................. 8-184801

[51] Int. Cl.$^6$ ................ G02F 1/03; G02F 1/01; G02F 1/29
[52] U.S. Cl. ............ 359/254; 359/276; 359/277; 359/316; 359/318
[58] Field of Search .................. 359/254, 276, 359/277, 316, 318

[56] References Cited

U.S. PATENT DOCUMENTS 3,259,014 7/1966 Johnson et al. .................. 359/318
4,848,879 7/1989 Nishimura et al. ............... 359/276

FOREIGN PATENT DOCUMENTS 6-138469 5/1994 Japan .

OTHER PUBLICATIONS

Yoshikazu Hori, et al. "Field–Controllable Liquid–Crystal Phase Grating", IEEE Transactions on Electron Devices, vol. ED–26, No. 11, (pp. 1734–1737), Nov., 1979.

M. W. Fritsch. "Schlieren Optical System Using Liquid Crystal Phase Gratings for Large Screen Projection", Displays, vol. 13, No. 1, (pp. 45–60), 1992.

R. Gerhard–Multhaupt, et al. "Viscoelastic Spatial Light Modualtors and Schlieren–Optical Systems for HDTV Projection Displays", Proc. SPIE, vol. 1255, (pp. 69–78), 1990.

Primary Examiner—Hung Xuan Dang
Assistant Examiner—Evelyn A. Lester
Attorney, Agent, or Firm—Oblon, Spivak, McClelland, Maier & Neustadt, P.C.

[57] ABSTRACT

A projection display apparatus includes a light source, a spatial light modulation device, a condenser lens, an aperture stop, and a projecting lens. When the spatial period of complex amplitude modulation in the spatial light modulation device is represented by p, the center wavelength of the incident light is represented by $\lambda$, and a half angle subtended by an area around an opening edge of the aperture stop at the condenser lens along the first direction is represented by $\theta asx$, parameters of the light source, the spatial light modulation device, the condenser lens, the screen, the aperture stop and the projecting lens and a relative positional relationship therebetween are defined such that the following condition is satisfied:

$$0.35 < \theta asx/\arcsin(\lambda/p) < 0.6.$$

24 Claims, 15 Drawing Sheets

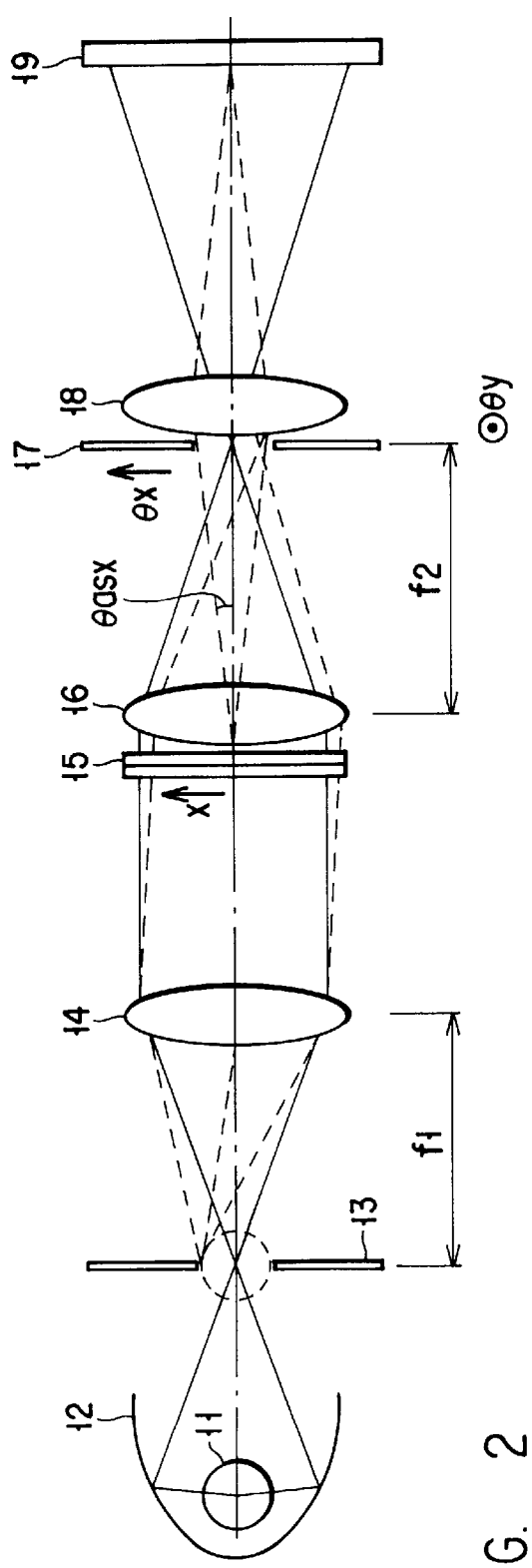
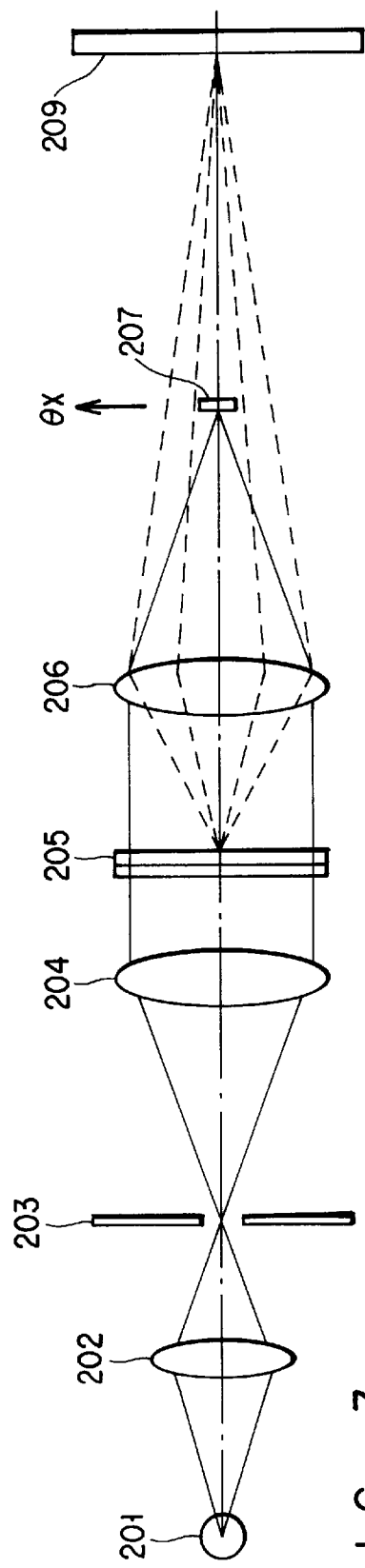
F I G. 2
F I G. 3

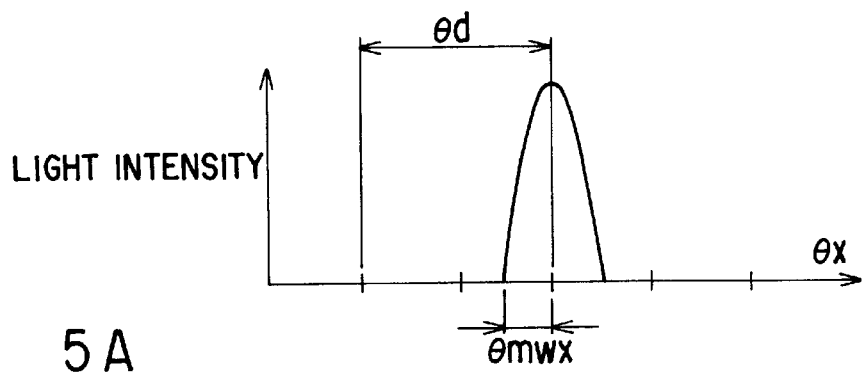
F I G. 5A
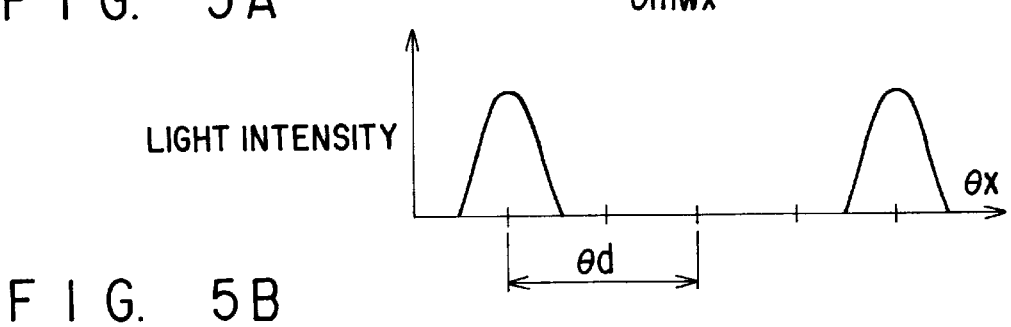
F I G. 5B
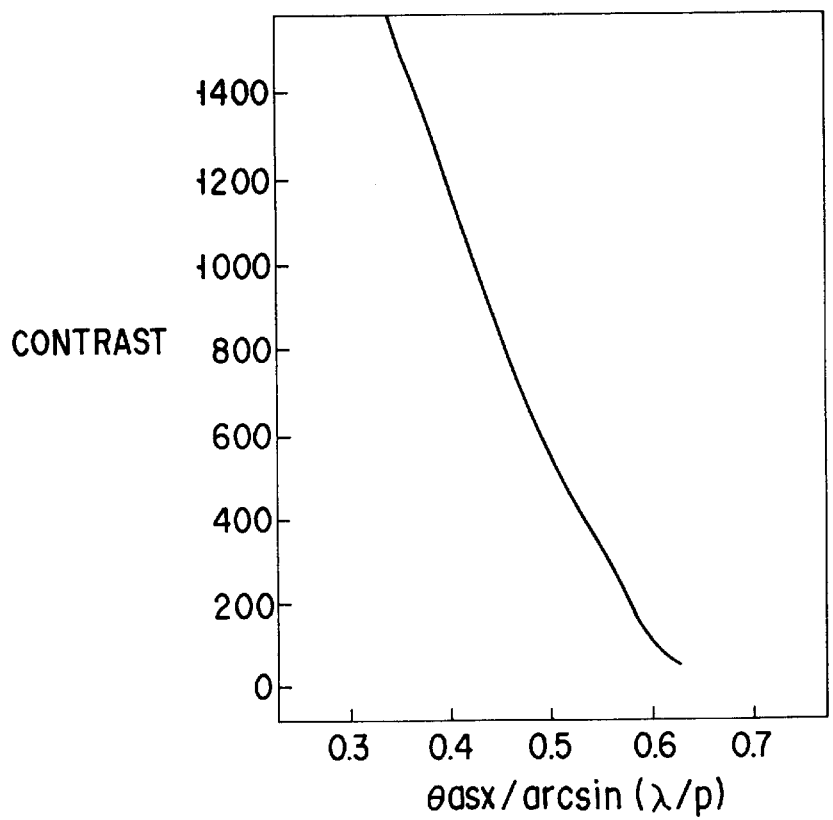
F I G. 6

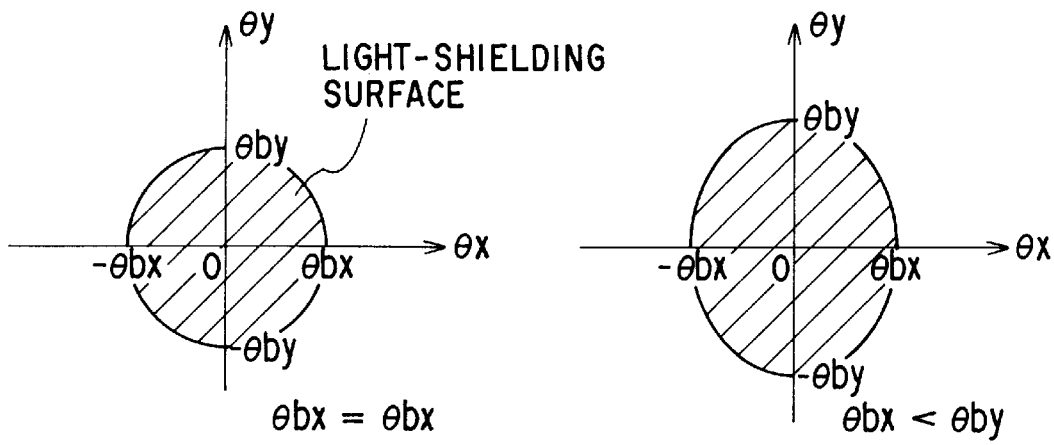
F I G. 13A    F I G. 13B
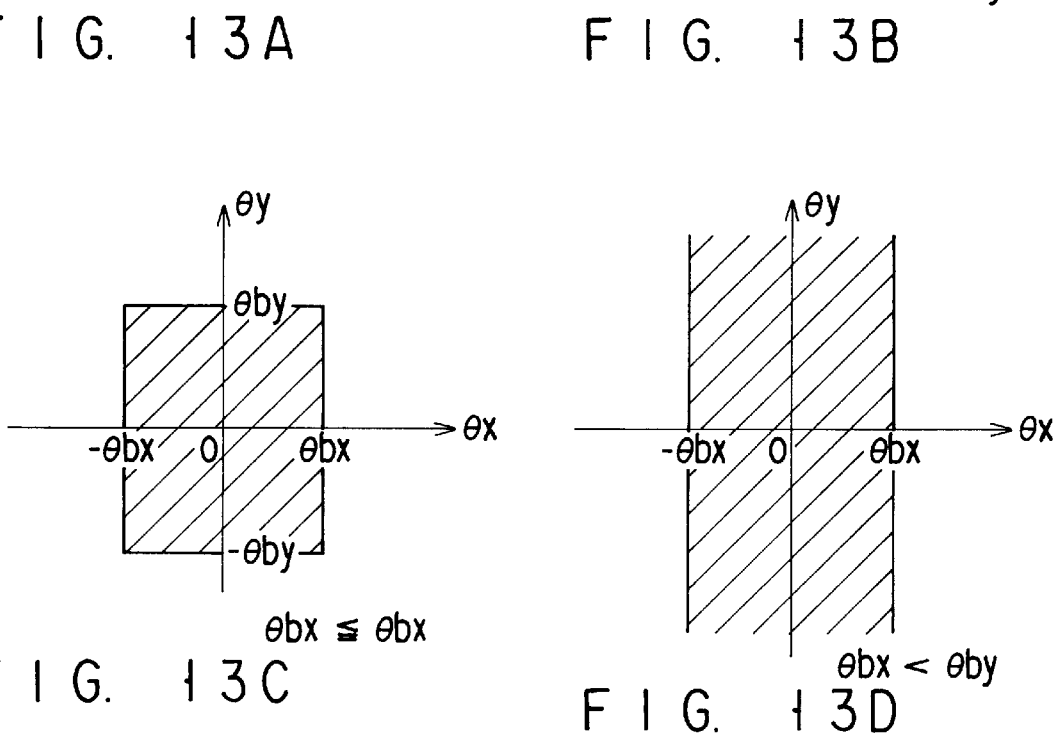
F I G. 13C    F I G. 13D
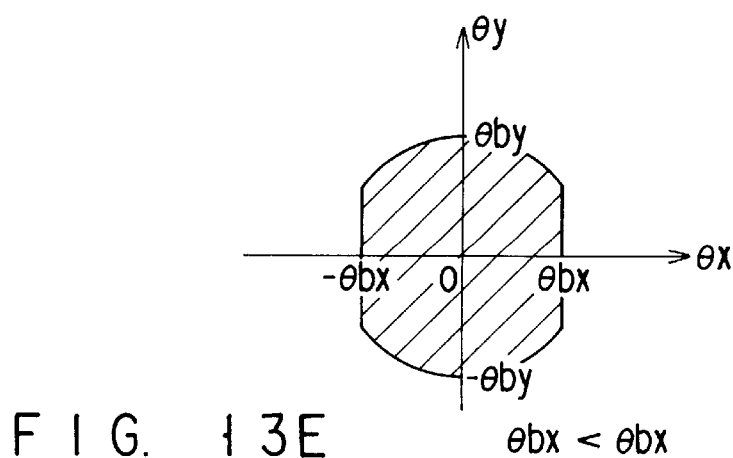
F I G. 13E

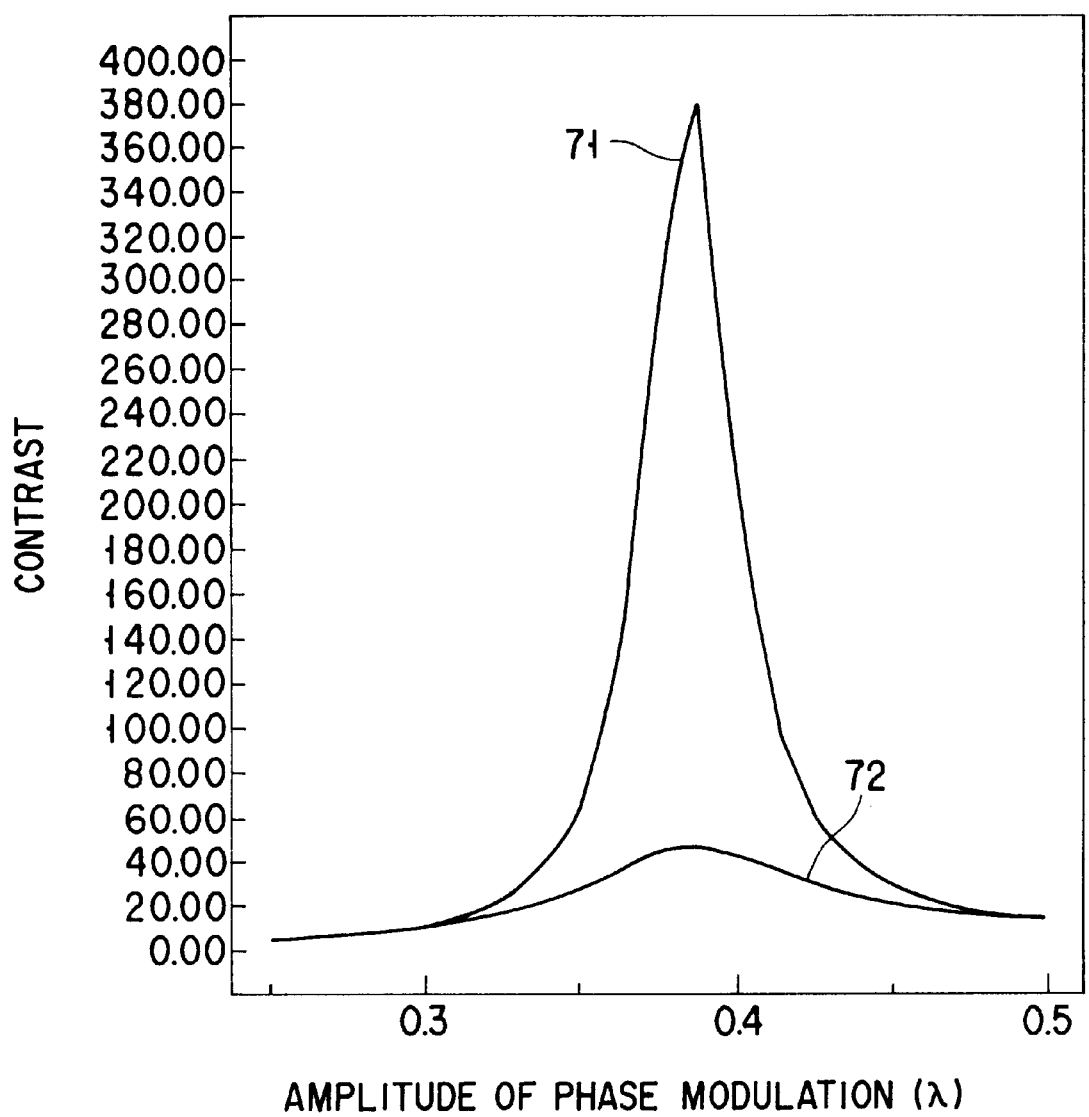
F I G. 21

PROJECTION DISPLAY APPARATUS AND SPATIAL LIGHT MODULATION DEVICE APPLIED TO THE SAME

BACKGROUND OF THE INVENTION

The present invention relates to a projection display apparatus and, more particularly, to a projection display apparatus using a spatial light modulation device which utilizes a diffraction effect and the spatial light modulation device applied to the apparatus.

Projection display apparatuses using a liquid crystal panel as a spatial light modulation device allow display with a screen size of 100 to 200 inches and have widely been put into practice as display apparatuses for TV images or computers. When a liquid crystal panel is used for a projection display apparatus instead of a CRT, a compact and lightweight apparatus with low power consumption and low cost can be realized.

The display apparatus using a liquid crystal panel has such various advantages, though it also has a disadvantage that the utilization efficiency of light from the light source is as low as several %, and the displayed image is dark. When this display apparatus is used to display a TV image for the purpose of, e.g., showing a motion picture, this problem is not so serious because it can be solved by darkening the room. However, a data projector for displaying a computer screen is often used in a bright place, and therefore it is essential to display a bright image.

In the projection display apparatus using a liquid crystal panel, the decrease in light utilization efficiency is mainly caused by the fact that the half of light incident on the liquid crystal panel is not used because polarization is used for light modulation. To realize display of a bright image, modulation techniques without using polarization have been studied. One of such techniques uses a spatial light modulation device (called a diffraction type spatial light modulation device) which utilizes a diffraction effect.

FIG. 1 shows the schematic arrangement of an optical system in a projection display apparatus using a diffraction type spatial light modulation device. This optical system basically illuminates a diffraction type spatial light modulation device 105 with light from a light source 101, and projects an image on the spatial light modulation device 105 onto a screen 109 through a projecting lens 106. More specifically, in the illumination optical system, white light emitted from the light source 101 is converged by a condenser lens 102. The opening is limited by a light source-side aperture stop 103 arranged at the converging position. Thereafter, the light is collimated into an almost parallel beam by a collimator lens 104 and irradiated on the spatial light modulation device 105.

The light which irradiates the spatial light modulation device 105 is limited in its maximum incident angle (or spread angle) with respect to the spatial light modulation device 105 by the actions of the light source-side aperture stop 103 and the collimator lens 104, i.e., increased in its directivity. In the spatial light modulation device 105, the incident light directly passes through some pixels, but is subjected in some pixels to complex amplitude modulation having a spatial periodical structure and diffracted in a predetermined direction.

In the projection side optical system, the image on the spatial light modulation device 105 is projected onto the screen 109 through the projecting lens 106. In this optical system, of light components which are not diffracted by the pixels of the spatial light modulation device 105, only light components reflected or absorbed by a light-shielding plate 107 and diffracted reach the screen 109. Consequently, a difference is generated in the brightness of the projected image between the pixels in which the light is diffracted and those in which the light is not diffracted, so that display with a contrast is enabled.

As the diffraction type spatial light modulation device 105, a device having a structure in which a liquid crystal is sandwiched between a first substrate having a striped transparent electrode and a second substrate having a transparent electrode formed on the entire surface is used, as described in, e.g., the report by Y. Hori et al., (IEEE TRANSACTIONS ON ELECTRON DEVICES, Vol. ED-26, No. 11 (1979): to be referred to as reference 1 hereinafter). When no voltage is applied between the transparent electrodes on the two substrates, the liquid crystal molecules are uniformly aligned so that the device optically seems a flat plate. When a voltage is applied, the alignment state of the liquid crystal changes along the striped transparent electrode, and the effect of a diffraction grating is obtained. Therefore, by turning on/off the applied voltage, white/black display is enabled. With the device structure shown in reference 1, the diffraction effect is expected to depend on the polarization direction of incident light. However, when the electrode arrangement is improved, the alignment state of the liquid crystal may be controlled, and the dependency on the polarization may be minimized. This may realize bright display.

To display a bright and high-contrast image on the screen 109 in the projection display apparatus using the diffraction type spatial light modulation device 105, a small and high-luminance light source may be used as the light source 101, and the size of the light-shielding plate 107 on the projection side may be optimized in correspondence with the size of the light source 101 or the size of the light source-side aperture stop 103.

Actually, however, the light-emitting point of a light source with a sufficient luminance has a predetermined size or more. Additionally, to efficiently pass the light from the light source 101, the light source-side aperture stop 103 cannot be extremely minimized. When the size of the light-shielding plate 107 on the projection side is set in correspondence with these members, the brightness and contrast of the image displayed on the screen 109 cannot be simultaneously increased. More specifically, to maintain the brightness of the projection display apparatus using not a diffraction type but a normal spatial light modulation device, the contrast is insufficient, i.e., only about 10 to 20, according to reference 1.

The optical system shown in FIG. 1 projects light diffracted by the spatial light modulation device 105 onto the screen 109 and is called a dark field projection optical system. In this dark field projection optical system, a black image can be sufficiently darkened, so that the display contrast can be made high. The projection display apparatus using a diffraction type spatial light modulation device generally uses this system.

In this dark field projection optical system, display of a white image corresponds to diffraction in pixels of the spatial light modulation device 105, as described above. For this reason, the light utilization efficiency in display of a white image largely depends on the shape of the diffraction grating on the spatial light modulation device 105 or the wavelength bandwidth of the illumination light. To obtain a high efficiency, the diffraction grating shape must be strictly managed. Therefore, a spatial light modulation device for obtaining a high light utilization efficiency can hardly be manufactured. In addition, since the uniformity of brightness of display depends on the uniformity of the diffraction grating shape, display at a high and uniform light utilization efficiency can hardly be realized. Furthermore, since this optical system uses diffracted light for projection, a lens having a small F-number must be used as the projecting lens 106. The projection lens tends to be large, resulting in an increase in cost. A compact and inexpensive apparatus can hardly be manufactured.

To the contrary, an optical system (bright field projection optical system) which has, in place of the light-shielding plate 107 serving as a projection side light-shielding device, an opening limiting device for passing only light near the optical axis, shields diffracted light, and projects only non-diffracted light onto the screen can be used. Since this system uses light passing near the optical axis for projection, the F-number of the projecting lens can be relatively large, so that a small and inexpensive projecting lens can be used. Display of a white image corresponds to pixels which do not cause diffraction. Since the light utilization efficiency in display of a white image does not depend on the shape of the diffraction grating or the wavelength bandwidth, display at a high light utilization efficiency and with uniform brightness can be easily realized. However, when a black image is to be displayed in this system, the contrast becomes low because the black image cannot be sufficiently darkened.

As described above, the diffraction type spatial light modulation device is one of devices capable of optical modulation independently of polarization and allows bright display in principle. However, when the diffraction type spatial light modulation device is incorporated in the optical system of the projection display apparatus and combined with an actually usable light source, the brightness or uniformity and the contrast of an image can hardly be simultaneously increased.

Conventionally, to solve this problem, the relationship between the size of the light source or the opening of the light source-side aperture stop and the size of the light-shielding surface of the light-shielding plate on the projection side is optimized. However, to maintain the advantage of this arrangement, i.e., the brightness of an image in comparison with a projection display apparatus using a normal spatial light modulation device, the contrast is sacrificed.

BRIEF SUMMARY OF THE INVENTION

It is an object of the present invention to provide a projection display apparatus which uses a spatial light modulation device and can simultaneously increase the brightness and contrast even when an actually usable light source is used.

It is another object of the present invention to provide a diffraction type spatial light modulation device which has a high light utilization efficiency and a satisfactory uniformity of the image brightness and can also ensure a high contrast even in combination with a bright field projection optical system capable of using a small projecting lens.

In order to achieve the above objects, according to the present invention, there is provided a projection display apparatus comprising:

a light source for emitting illumination light;

a spatial light modulation device having a plurality of pixels to receive the illumination light emitted from the light source and periodically perform complex amplitude modulation of the incident light in a first direction in each pixel;

a condenser lens associated with the spatial light modulation device to converge light emerging from the spatial light modulation device;

a projecting lens associated with the condenser lens to project light from the condenser lens onto a screen; and an aperture stop associated with said condenser lens to partially limit the light from said condenser lens, wherein when a spatial period of complex amplitude modulation in the spatial light modulation device is represented by p, a center wavelength of the incident light is represented by $\lambda$, and a half angle subtended by an area around on opening edge of the aperture stop at the condenser lens along the first direction is represented by $\theta asx$, parameters of the light source, the spatial light modulation device, the condenser lens, and said aperture stop and a relative positional relationship therebetween are defined such that the following condition is satisfied:

$$0.35 < \theta asx / \arcsin(\lambda/p) < 0.6$$

In order to achieve the above objects, there is also provided a projection display apparatus comprising:

a light source for emitting illumination light;

a spatial light modulation device having a plurality of pixels to receive the illumination light emitted from the light source and periodically perform complex amplitude modulation of the incident light in a first direction in each pixel;

a projecting lens for projecting light emerging from the spatial light modulation device onto a screen; and an aperture stop associated with the projecting lens to partially limit light from the projecting lens, wherein when a spatial period of complex amplitude modulation in the spatial light modulation device is represented by p', a center wavelength of the incident light is represented by $\lambda'$, and a half angle subtended by an area around an opening edge of the aperture stop at the condenser lens along the first direction is represented by $\theta asx'$, parameters of the light source, the spatial light modulation device, the screen, the aperture stop, and the projection lens and a relative positional relationship therebetween are defined such that the following condition is satisfied:

$$0.35 < \theta asx / \arcsin(\lambda'/p') < 0.6$$

In these projection display apparatuses, the relationship between the spatial period of complex amplitude modulation of light on the spatial light modulation device and the opening size or light-shielding surface size of the projection side aperture stop is appropriately set. In addition, the relationship between the width of the pixel of the spatial light modulation device and the maximum incident angle of the illumination light on the spatial light modulation device is appropriately set. With this arrangement, the brightness and contrast of the displayed image can be simultaneously increased.

The spatial light modulation device of the present invention has at least one of the following conditions (a) to (d):

(a) A complex amplitude modulation pattern in each pixel is set such that a 1st-order diffracted light component and a −1st-order diffracted light component of emerging light mutually reduce intensities near a region where a 0th-order light component is present.

(b) An effective opening width of the pixel along the predetermined direction is an integer multiple of a modulation period, and a complex amplitude modulation pattern in each pixel is symmetric in an opening of the pixel.

(c) An effective opening width of the pixel along the predetermined direction is an odd multiple of ½ a modulation period, and a complex amplitude modulation pattern in each pixel is shifted by ¼ the modulation period in the predetermined direction from a position where the complex amplitude modulation pattern is symmetric in an opening of the pixel.

(d) An effective opening width of the pixel along the predetermined direction is an odd multiple of ½ a modulation period, and a complex amplitude modulation pattern in each pixel is anti-symmetric in an opening of the pixel.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a sectional view showing the arrangement of an optical system in a projection display apparatus according to the first embodiment of the present invention;

FIG. 3 is a sectional view showing the arrangement of a dark field projection optical system in the projection display apparatus to which the present invention is applied;

FIGS. 5A and 5B are graphs showing examples of a light intensity distribution on the surface of a projection-side aperture stop, which are obtained when the size of a light source-side aperture stop of the first embodiment is sufficiently reduced;

FIG. 6 is a graph showing the result of simulation for the relationship between the size of the projection-side aperture stop and the contrast in the first embodiment;

FIGS. 13A to 13E are views showing the specific shapes of a projection-side light-shielding plate used in the second embodiment of the present invention;

FIG. 21 is a graph showing the result of calculation of contrast, which is obtained when the spatial light modulation device according to the second embodiment is used for the projection display apparatus shown in FIG. 1.

DETAILED DESCRIPTION OF THE INVENTION

Figure 1:
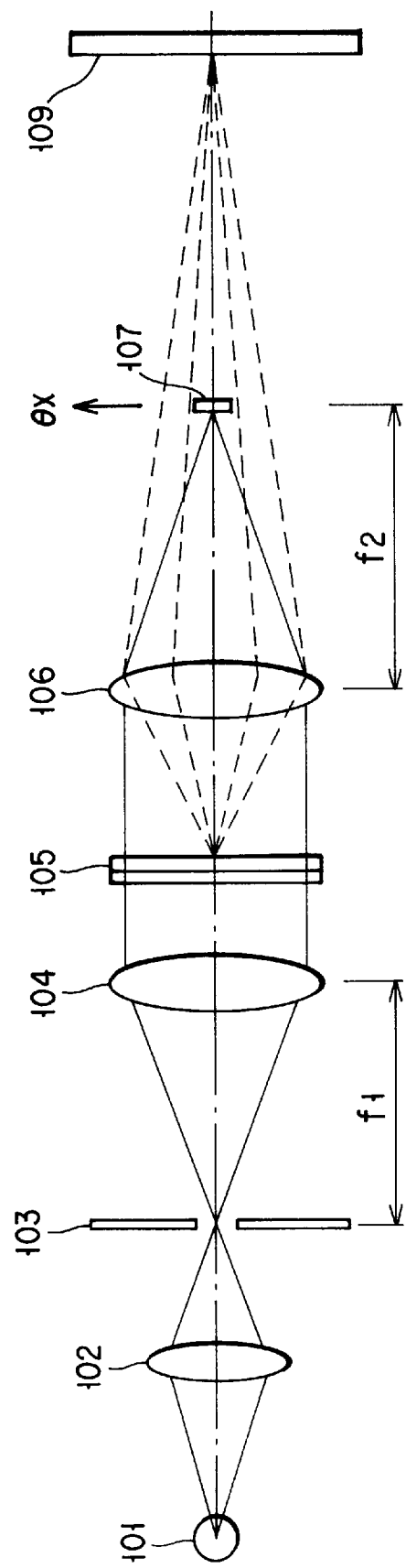
FIG. 1 is a sectional view showing the arrangement of a dark field projection optical system in a projection display apparatus using a diffraction type spatial light modulation device.

The present invention is realized by an optical system shown in FIG. 2 or 3. The optical system shown in FIG. 2 comprises a light source 11, a reflecting mirror 12, a light source-side aperture stop 13, a collimator lens 14, a diffraction type spatial light modulation device 15, a condenser lens 16, a projection-side aperture stop 17, a projecting lens 18, and a screen 19. The optical system shown in FIG. 3 is an optical system in a dark field projection display apparatus, which has the same optical elements as those of the optical system shown in FIG. 1. In the optical system shown in FIG. 3, a projecting lens 206 has the function of the condenser lens 16 and the projecting lens 18 of the optical system shown in FIG. 2. In the optical system shown in FIG. 3, when the period of complex amplitude modulation of light and the pixel width in a diffraction type spatial light modulation device 205, the width of the light-shielding surface of a light-shielding plate 207, and the maximum incident angle of light for illuminating the spatial light modulation device 205 are set as in a numerical example (to be described later), the same effect as that of the optical system shown in FIG. 2 can be obtained. An example in which the present invention is applied to the optical system shown in FIG. 2 will be described below in detail, though the present invention can also be applied to the optical system shown in FIG. 3 without posing any problem.

In FIG. 2, the parameters of the light source, the spatial light modulation device, the condenser lens, the screen, the aperture stop, and the projecting lens and the relative positional relationship therebetween are set such that at least condition (4) is satisfied. In FIG. 3 as well, the parameters of the light source, the spatial light modulation device, the screen, the aperture stop device, and the projecting lens and the relative positional relationship therebetween are set such that at least condition (4) is satisfied.

First Embodiment

A projection display apparatus of this embodiment comprises:

a light source for emitting illumination light;

a spatial light modulation device having a plurality of pixels to receive the illumination light emitted from the light source and periodically perform complex amplitude modulation of the incident light in a first direction in each pixel;

a condenser lens associated with the spatial light modulation device to converge light emerging from the spatial light modulation device;

a projecting lens, which are associated with the condenser lens to project light from the condenser lens onto a screen; and an aperture stop associated with the condenser lens to partially limit the light from the condenser lens, wherein when a spatial period of complex amplitude modulation in the spatial light modulation device is represented by p, a center wavelength of the incident light is represented by $\lambda$, and a half angle subtended by an area around an opening edge of the aperture stop at the condenser lens along the first direction is represented by $\theta asx$, parameters of the light source, the spatial light modulation device, the condenser lens, and the aperture stop and a relative positional relationship therebetween are defined such that the following condition is satisfied:

$$0.35 < \theta asx / \arcsin(\lambda/p) < 0.6$$

More specifically, as shown in FIG. 2, white light emitted from the light source 11 is reflected by the reflecting mirror 12 and converged. The light beam is limited by the light source-side aperture stop 13 arranged at the converging position, i.e., the geometrical focal position of the reflecting mirror 12, collimated into an almost parallel beam by the collimator lens 14, and incident on the spatial light modulation device 15 as illumination light. As the light source 11, a lamp such as a metal halide lamp having a small light-emitting portion and a high luminous efficiency is used. As the reflecting mirror 12, a mirror having the shape of an ellipsoid of revolution is used. In the spatial light modulation device 15, the incident illumination light passes through some pixels without any special modulation, but is subjected in some pixels to complex amplitude modulation having a spatial periodical structure and diffracted in a predetermined direction. The image on the spatial light modulation device 15 is projected onto the screen 19 through the projecting lens 18. In this case, the light diffracted by the pixels of the spatial light modulation device 15 is reflected or absorbed by the projection-side aperture stop 17 and only light components which are not diffracted reach the screen 19. As a result, a difference is generated in the brightness of the image displayed on the screen 19 between the pixels in which the light is diffracted and those in which the light is not diffracted, so that display with a contrast is enabled.

Figure 4A:
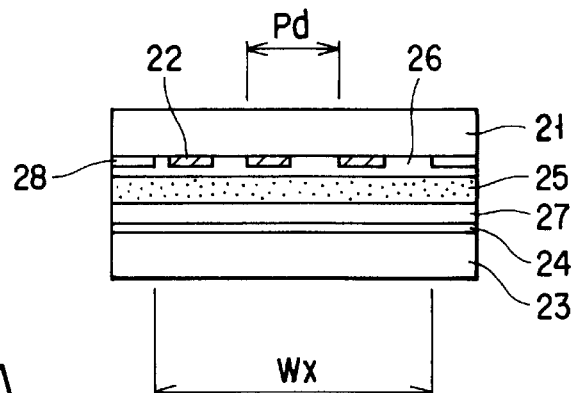
FIG. 4A is a sectional view showing the structure of a pixel in the diffraction type spatial light modulation device of the first embodiment in FIG. 2.
Figure 4B:
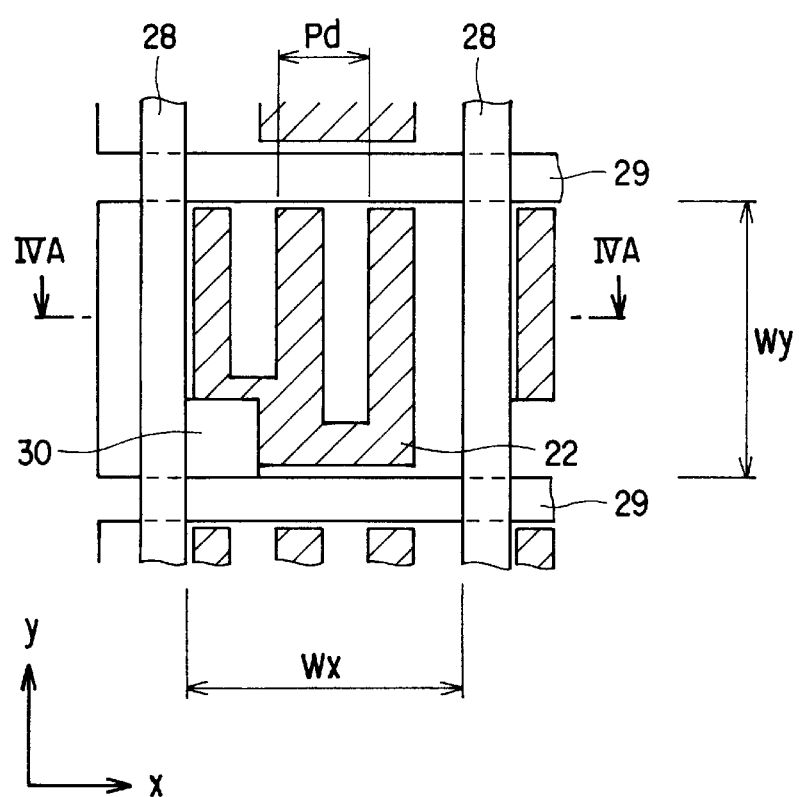
FIG. 4B is a plan view showing the structure of the pixel.
Figure 4C:
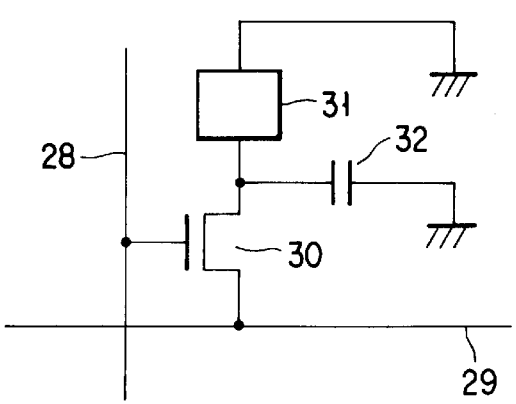
FIG. 4C is an equivalent circuit diagram showing the structure of the pixel.

FIGS. 4A to 4C show the structure of the diffraction type spatial light modulation device 15. FIG. 4A is a sectional view taken along a line IVA—IVA in FIG. 4B, FIG. 4B is a plan view, and FIG. 4C is an equivalent circuit diagram. FIGS. 4A to 4C show the structure of one pixel. In this example, complex amplitude modulation having a spatial periodical structure is performed for incident light. For this purpose, a liquid crystal layer 25 is sandwiched between a first substrate 21 having a transparent interdigital electrode 22 as a pixel electrode formed on the surface and a second substrate 23 having a common transparent electrode 24 formed on the entire surface. Transparent alignment layers 26 and 27 are formed between the liquid crystal layer 25 and the substrates 21 and 23, respectively. Data lines 28 are formed on the first substrate 21 along the direction x, and scanning lines 29 are formed on the first substrate 21 along the direction y. A TFT (Thin Film Transistor) 30 is also formed on the first substrate 21. The gate electrode of the TFT 30 is connected to the data line 28, and the source electrode of the TFT 30 is connected to the scanning line 29. The drain electrode of the TFT 30 is connected to a pixel 31 constituted by the transparent interdigital electrode 22, the liquid crystal layer 25, and the common transparent electrode 24, and a capacitor 32. A voltage corresponding to a pixel signal is applied to the data line 28, and a scanning voltage is sequentially applied to the scanning lines 29.

Assume that the molecular alignment of the liquid crystal layer 25 is parallel alignment (homogeneous alignment), i.e., parallel to the fingers of the transparent interdigital electrode 22. When no voltage is applied between the electrodes 22 and 24, the pixel 31 optically seems a flat plate. When a voltage is applied, the alignment state of the liquid crystal layer 25 changes, along the electrode shape, at portions corresponding to the fingers of the transparent interdigital electrode 22, so that the effect of a diffraction grating, i.e., light complex amplitude modulation effect having a spatial periodical structure is obtained. For light having an amplitude in a direction parallel to the fingers, a spatial period pd of the transparent interdigital electrode 22 portion equals a period p of phase modulation of light. In the spatial modulation device with such a structure, the diffraction effect still depends on the polarization direction. However, when the arrangement of the transparent interdigital electrode 22 or the alignment of the liquid crystal layer 25 is implemented, the alignment state of the liquid crystal layer 25 in an operative state can be controlled to reduce or eliminate the dependency on polarization.

The structure of the diffraction type spatial light modulation device 15 is not limited to that shown in FIGS. 14A to 14C. Any structure can be employed as long as the size of a pixel and the spatial period of light complex amplitude modulation satisfy conditions to be described later.

The first point of the present invention, i.e., the parameters of the diffraction type spatial light modulation device 15 and the relationship between the diffraction type spatial light modulation device 15 and the projection-side aperture stop 17 will be described next.

For the descriptive convenience, the relationship between the sectional view of the optical system shown in FIG. 2 and the direction of the spatial light modulation device 15 shown in FIGS. 4A to 4C will be defined in advance. FIG. 2 is a sectional view taken along a plane along an alignment direction x of the fingers of the transparent interdigital electrode 22 in the pixel 31 shown in FIGS. 4A to 4C (a plane including the straight line IVA—IVA which is vertical to the sheet surface of FIGS. 4A to 4C). Therefore, diffraction of light by periodical complex amplitude modulation in the pixel 31 occurs along a direction θx in FIG. 2.

Assume that the opening size of the light source-side aperture stop 13 in the optical system shown in FIG. 2 is sufficiently reduced, i.e., the light source 11 can be substantially regarded as a point source. Consider the intensity distribution of light which reaches the surface of the projection-side aperture stop 17 through one pixel of the spatial light modulation device 15. When the pixel is OFF, i.e., when the light transmitted through the pixel is not subjected to special complex amplitude modulation, the distribution has a spread angle θmwx (half-angle value) which is defined by diffraction by the opening having the size of the pixel, as shown in FIG. 5A. The spread angle θmwx is given by the following equation:

$$\theta mwx = \arctan(\lambda/Wx) \quad (1)$$

λ: the wavelength of the illumination light
Wx: the size of the pixel of the spatial light modulation device 15 along the modulation direction In FIGS. 5A and 5B, the abscissa represents the direction angle viewed from the position of the condenser lens 16 along the direction θx in FIG. 2, and only the intensity distribution of a main lobe is shown for the descriptive convenience.

When the pixel is ON, i.e., when the light transmitted through the pixel is subjected to complex amplitude modulation having a spatial periodical structure, a 1st-order diffracted light component appears in a direction θd which is defined by the spatial period (the fundamental period of complex amplitude modulation) p of complex amplitude modulation of light in the pixel, as shown in FIG. 5B. The direction θd is given by equation (2) below:

$$\theta d = \arcsin(\lambda/p) \quad (2)$$

λ: the wavelength of the illumination light
p: the spatial period of complex amplitude modulation of light in the pixel A lot of pixels in the ON and OFF states are simultaneously present on the screen as the entire panel of the diffraction type spatial light modulation device 15 in correspondence with an image to be displayed. For this reason, actually, the components shown in FIGS. 5A and 5B are simultaneously present. When one of the two components is selectively projected onto the screen 19, display with a contrast is enabled. The optical system shown in FIG. 2 is a bright field projection system which shields the component in FIG. 5B by the projection-side aperture stop 17 and projects the component in FIG. 5A, and only this example will be described below. However, the present invention can also be effectively applied to the dark field projection optical system shown in FIG. 3, which shields the component in FIG. 5A and projects the component in FIG. 5B.

In the bright field projection optical system shown in FIG. 2, to discriminate the ON and OFF states of the pixels, the light component shown in FIG. 5B is shielded by the projection-side aperture stop 17, and the light component shown in FIG. 5A is projected. For the opening size of the projection-side aperture stop 17, the width along the vertical direction x in FIG. 2 (the modulation direction of complex amplitude modulation in the pixel of the spatial light modulation device 15) is set such that the half-angle value (called an opening half-width) θasx of the half angle subtended by an area around on opening edge of the aperture stop at the condenser lens is represented as follows:

$$\theta asx = \theta d/2 \quad (3)$$

With this arrangement, the margin of the opening size for separating the light components shown in FIGS. 5A and 5B can be maximized. This condition is an optimum set condition for ensuring the contrast of the image displayed on the screen 19 even when the size of the light source-side aperture stop 13 (to be described later) is increased to some extent, i.e., even when the light source 11 is not a point source but a light source with some spread.

Actually, the range where equation (3) almost holds is the allowance of the region for ensuring the margin of the opening size. The result of simulation performed to obtain the allowance of the opening size of the projection-side aperture stop 17 will be described below. Table 1 shows the simulation conditions:

TABLE 1

| Spatial period p of complex amplitude modulation | 8 μm |
|---|---|
| Pixel width Wx in the direction x | 96 μm |
| Maximum incident angle θLx of illumination light | 1.48° |
| Wavelength λ of illumination light | 0.55 μm |

As the optical system, the system shown in FIG. 2 was used. As the light intensity distribution of light emitted from the light source 11 and reaching the surface of the light source-side aperture stop 13, a circular distribution with a uniform intensity was assumed. The radius of the circle was assumed such that the lead angle (θLr) viewed from the position of the collimator lens 14 was 3°. The pixel of the spatial light modulation device 15 and the maximum incident angle of illumination light were assumed according to the above simulation conditions.

Figure 7:
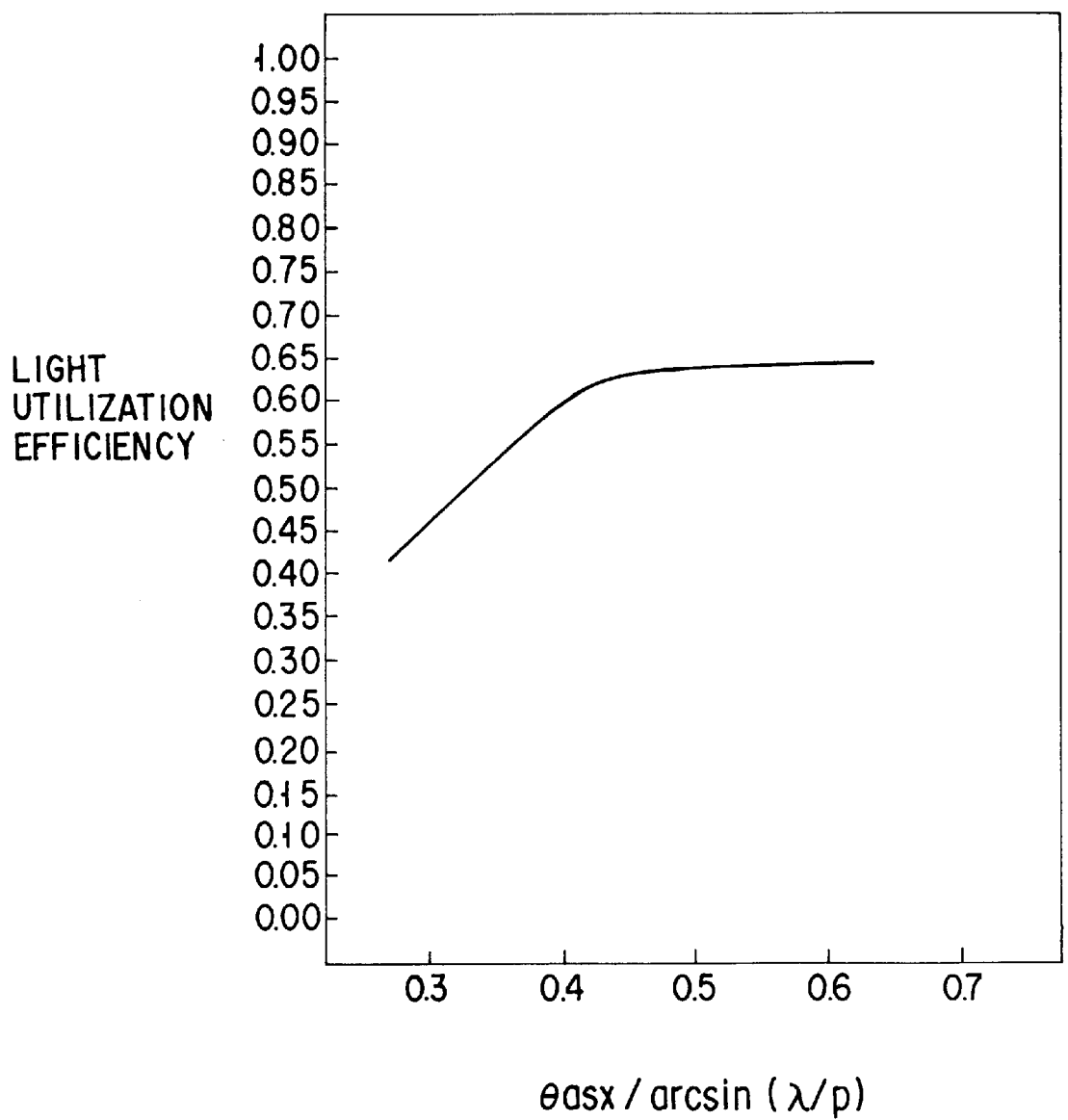
FIG. 7 is a graph showing the result of simulation for the relationship between the size of the projection-side aperture stop and the light utilization efficiency in the first embodiment.

FIGS. 6 and 7 are graphs showing the result of this simulation, i.e., the relationship between the opening size θasx of the projection-side aperture stop 17, and the contrast and the light utilization efficiency, respectively. In order to appreciate the simulation to not depend on wavelength λ of the illumination light and the spatial period p of complex amplitude modulation of light in the pixel, so that values obtained by dividing θasx by arcsin(λ/p) are used for the abscissa. Generally, the contrast is required to be 100 or more, and as is apparent from FIG. 6, θasx/arcsin(λ/p)<0.6 must hold. To maintain the advantage of the system using no polarizing plate, i.e., the brightness of the image, the light utilization efficiency is preferably 60% or more. As can be seen from FIG. 7, when θasx/arcsin(λ/p) is 0.35 or less, the light utilization efficiency abruptly decreases to 0.6 or less. For this reason, 0.35<θasx/arcsin(λ/p) preferably holds. Note that the light utilization efficiency is defined by the ratio of the total amount of light passing through the projection-side aperture stop 17 to the total amount of light before the light source-side aperture stop 13.

As is apparent from the above result of simulation, to ensure a contrast equal to or larger than the practically required value, i.e., 100 or more for the image displayed on the screen 19, and also ensure a light utilization efficiency of 60% or more to obtain a sufficient image brightness, the following condition must be satisfied:

$$0.35 < \theta asx/\arcsin(\lambda/p) < 0.6 \quad (4)$$

This condition is defined by the parameters of the light source 11, the spatial light modulation device 15, the condenser lens 16, and the projection-side aperture stop 17, and the relative positional relationship therebetween.

The second point of the present invention, i.e., the parameters of the spatial light modulation device 15 and the relationship between the spatial light modulation device 15 and the light source-side aperture stop 13 will be described below. In this case as well, the preferable conditions are defined by the parameters of the light source 11, the spatial light modulation device 15, the condenser lens 16, and the projection-side aperture stop 17 and the relative positional relationship therebetween.

In the optical system shown in FIG. 2, the maximum incident angle of illumination light on the spatial light modulation device 15 is defined by the opening size of the light source-side aperture stop 13 and the focal length of the collimator lens 14. When, for the opening size of the light source-side aperture stop 13, the width along the vertical direction x in FIG. 2, i.e., along the modulation direction of complex amplitude modulation in the pixel of the spatial light modulation device 15 is represented by x1, and the focal length of the collimator lens 14 is represented by f1, the opening size of the light source-side aperture stop 13 viewed from the collimator lens 14, i.e., the maximum incident angle θLx of illumination light incident on the spatial light modulation device 15 along the vertical direction x in FIG. 2 is represented as follows:

$$\theta Lx = \arctan(x1/f1) \quad (5)$$

For the descriptive convenience, consider a model in which point sources are placed at the center of the light source-side aperture stop 13 and at the end points along the vertical direction in FIG. 2 (at positions separated from the optical axis by ±1), as indicated by a dotted line. FIGS. 8A and 8B and FIGS. 9A and 9B are graphs showing the light intensity distributions on the surface of the projection-side aperture stop 17. FIGS. 8A and 8B and FIGS. 9A and 9B are different in the opening size x1 of the light source-side aperture stop 13. The opening size of the projection-side aperture stop 17 is set as described above such that, in this case, the optimum value represented by equation (3), i.e., θasx=θd/2 is satisfied.

Figure 9A:
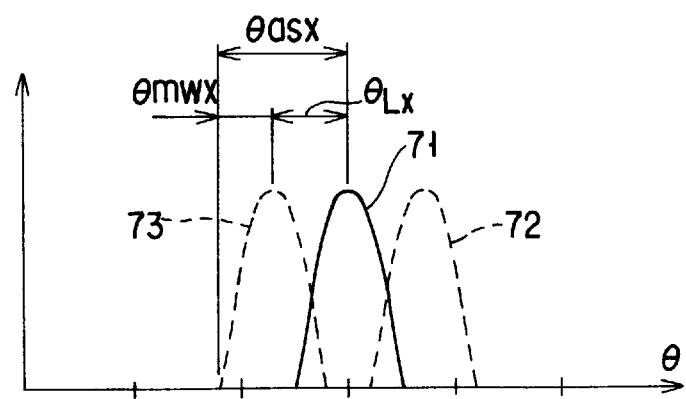
FIGS. 9A and 9B are graphs showing examples of the light intensity distribution on the surface of the projection-side aperture stop in the same system as in FIGS. 8A and 8B, which are obtained when the size of the opening of the light source-side aperture stop is increased.
Figure 9B:
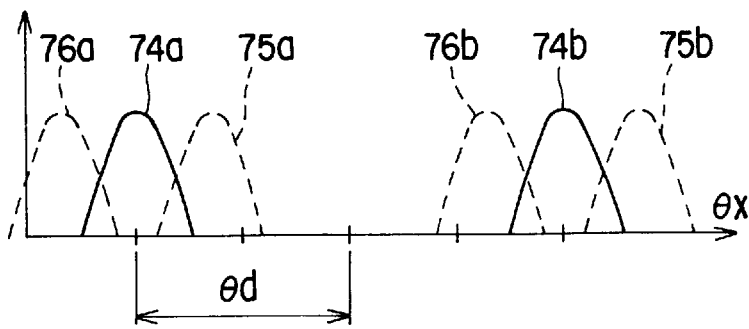

When the opening size x1 of the light source-side aperture stop 13 is relatively large, the light component in FIG. 9A, which has passed through an OFF pixel of the spatial light modulation device 15, and the light component in FIG. 9B, which has passed through an ON pixel, are incompletely separated, resulting in a decrease in contrast of the displayed image.

The light component passing through the OFF pixel, which is not subjected to special complex amplitude modulation in the pixel, exhibits the distribution shown in FIG. 9A. A main lobe 71 in FIG. 9A represents light emitted from the point source on the optical axis, and main lobes 72 and 73 represent light components emitted from the point sources at the ends of the light-source side opening. The opening of the projection-side aperture stop 17 has only a width 2θasx=θd represented by the total angle about the optical axis. Therefore, the light in FIG. 9A, which must be completely projected onto the screen 19, is partially shielded by the projection-side aperture stop 17, resulting in a decrease in projection light amount.

On the other hand, the light component passing through the ON pixel, which is subjected to complex amplitude modulation having a spatial periodical structure in the pixel, exhibits the distribution shown in FIG. 9B. To the contrary, this light must be completely shielded by the projection-side aperture stop 17, though the light partially passes through the opening of the projection-side aperture stop 17 and is projected onto the screen 19 through the projecting lens 18.

As described above, when the opening size x1 of the light source-side aperture stop 13 is large, both the brightness and contrast of the displayed image decrease. To prevent this, the relationship between the opening size of the light source-side aperture stop 13 and the spatial period of complex amplitude modulation of light in the pixel of the spatial light modulation device 15 may be limited to that shown in FIGS. 8A or 8B. The condition at this time is represented by equation (6) below:

$$\theta Lx + \theta mwx = \theta axs \quad (6)$$

Figure 8A:
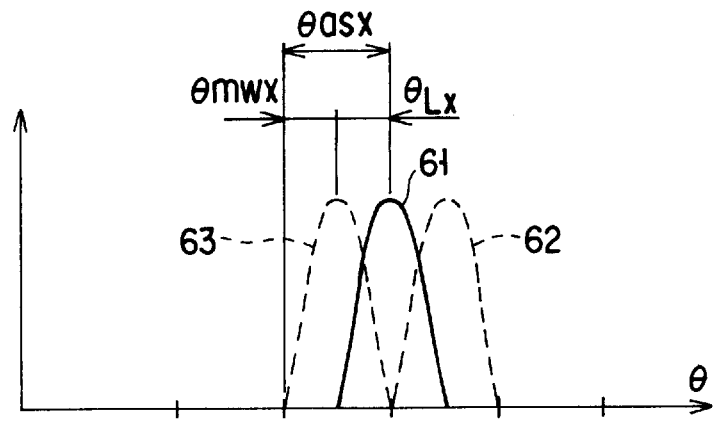
FIGS. 8A and 8B are graphs showing examples of a light intensity distribution on the surface of the projection-side aperture stop, which are obtained when a point source in the optical system shown in FIG. 2 is placed at the center of the illumination-side aperture stop and at the end point of the illumination-side aperture stop, respectively.
Figure 8B:
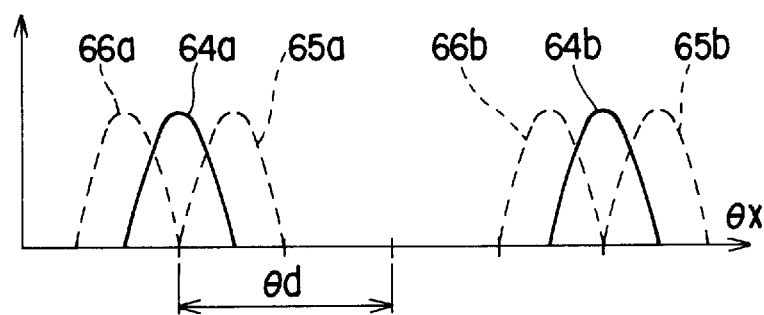

Under this condition, the light component shown in FIG. 8A, which has passed through the OFF pixel, and the light component shown in FIG. 8B, which has passed through the ON pixel, are completely separated, so that the contrast of the displayed image is kept high. Since the spread angle of illumination light is also maximized under the condition for maintaining the high contrast, the efficiency of using the light from the light source 11 is also maximized under this condition, and the brightness of the displayed image can also be ensured. Actually, even when the condition (6) is not strictly satisfied, a practical effect can be obtained under a similar condition.

The result of simulation performed to obtain the allowance of the opening size of the light source-side aperture stop 13 will be described. Assumptions for the optical system and the light source are the same as those shown as the simulation conditions in Table 1. The pixel of the spatial light modulation device 15 and the maximum incident angle of illumination light were assumed according to simulation conditions shown in Table 2:

TABLE 2

| | |
|---|---|
| Spatial period p of complex amplitude modulation | 8 μm |
| Pixel width Wx in the direction x | 96 μm |
| Maximum incident angle θLx of illumination light | 1.48° |
| Wavelength of illumination light | 0.55 μm |

Figure 10:
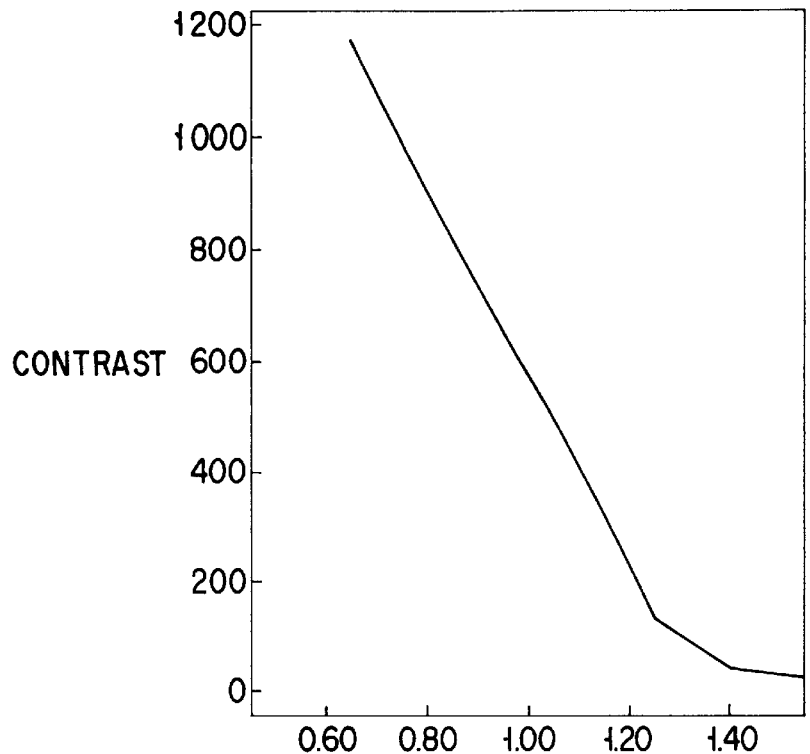
FIG. 10 is a graph showing the result of simulation for the relationship between the size of the light source-side aperture stop and the contrast in the first embodiment.
Figure 11:
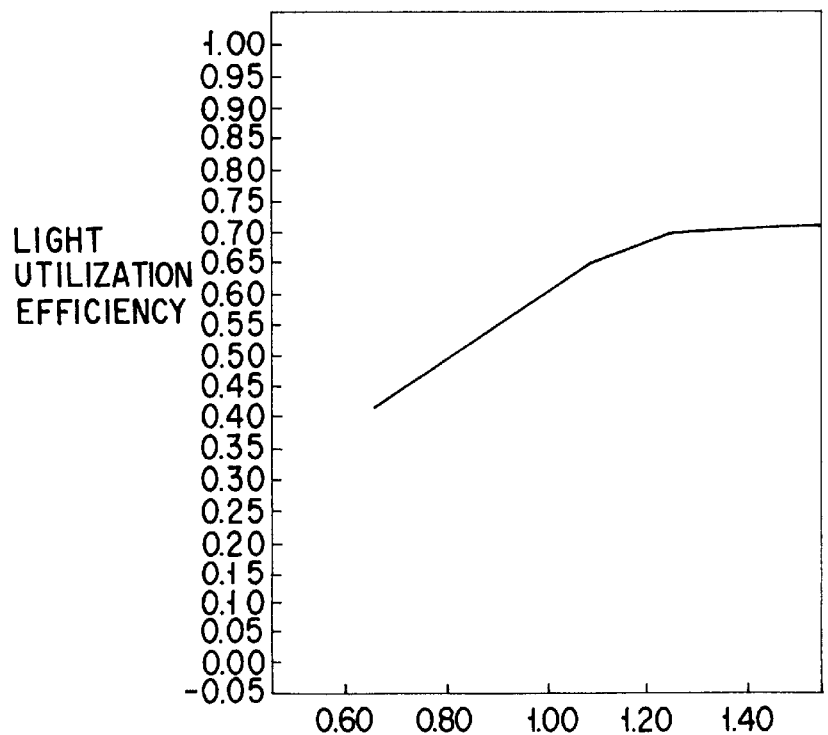
FIG. 11 is a graph showing the result of simulation for the relationship between the size of the light source-side aperture stop and the light utilization efficiency in the first embodiment.

FIGS. 10 and 11 are graphs showing the result of this simulation, i.e., the relationship between the opening size of the light source-side aperture stop 13, and the contrast and the light utilization efficiency, respectively. In order to appreciate the simulation to not depend on the wavelength λ of illumination light, pixel width Wx, and the opening half-width θaxs of the projection-side apparatus stop, so that value {θLx+arctan (θ/Wx)}/θaxs normalized the maximum incident angle θLx by the x, Wx and θaxs. Generally, the contrast is required to be 100 or more, as described above, and as is apparent from FIG. 10, {θLx+arctan(λ/Wx)}/θasx<1.3 must hold. To ensure a light utilization efficiency of 60% or more to maintain the advantage of the system using no polarizing plate, i.e., the brightness of the image, 0.8<{θLx+arctan(λ/Wx)}/θasx must hold.

As is apparent from the above result, to ensure a contrast equal to or larger than the practically required value, i.e., 100 or more and also ensure a light utilization efficiency of 60% or more, the following condition must be satisfied:

$$0.8 < \{\theta Lx + \arctan(\lambda/Wx)\}/\theta asx < 1.3 \quad (7)$$

For the opening size of the light source-side aperture stop 13 or the projection-side aperture stop 17, only the opening size along the modulation direction (direction for causing diffraction) θx of complex amplitude modulation of light in the pixel has been described above. This is mainly because separation between diffracted and nondiffracted light components is important in maintaining the contrast of the displayed image.

The opening size of the light source-side aperture stop 13 or the projection-side aperture stop 17 along the direction perpendicular to the diffraction direction hardly affects the contrast of the image. However, it may become a factor for changing the brightness of the image depending on the combination with the light source 11 to be used. The opening size of the aperture stop 13 or 17 along the direction perpendicular to the diffraction direction will be described below, and specific examples of the opening shape of the aperture stop 13 or 17 will be described.

To ensure the contrast of the displayed image, along the direction θx, the opening size θasx of the projection-side aperture stop 17 or the maximum incident angle of illumination light incident on the spatial light modulation device 15, i.e., the lead angle θLx which is defined by viewing the opening of the light source-side aperture stop 13 from the spatial light modulation device 15 must be limited within a certain range. However, along the direction θy perpendicular to the direction θx, not so strict limitation conditions are required. In the present invention, the lead angle θLy is set to be larger than the lead angle θLx, and accordingly, the opening size θasy is set to be larger than the opening size θasx, i.e.;

$$\theta Lx \leq \theta Ly$$

$$\theta asx \leq \theta asy$$

With this arrangement, brighter display is enabled without degrading the contrast of the displayed image.

A setting example of the light source-side aperture stop 13 will be described. As shown in FIG. 2, as the reflecting mirror 12, a mirror having the shape of an ellipsoid of revolution is used. The light source 11 such as a metal halide lamp having a rectilinear light-emitting portion is placed at the second focal position of the reflecting mirror 12. At the position of the light source-side aperture stop 13 (the second focal plane of the reflecting mirror 12), the light energy exhibits a circular distribution. When the radius of this circular region is represented by RL, and the lead angle defined by viewing the circular region from the position of the collimator lens 14 is represented by θLr, equation (8) holds:

$$\theta Lr = \arctan(RL/f1) \quad (8)$$

The size of the light source 11 need not be taken into consideration when inequality (9) below holds for the spread angle of the light source 11:

$$\theta Lr < \theta Lx \quad (9)$$

Generally, however, inequality (10) holds in many cases:

$$\theta Lx \leq \theta Lr \quad (10)$$

In this case, the light source-side aperture stop 13 must be set to optimize the brightness or contrast of the image. In the present invention, θLy is defined such that the following relation is satisfied:

$$\theta Lx \leq \theta Lr \leq \theta Ly \quad (11)$$

i.e., $$\theta Lx \leq \theta Lr \quad (12)$$

A setting example of the projection-side aperture stop 17 will be described. Along the direction θy, the opening size θasy is not directly associated with selection of the diffracted light component, and therefore, can be freely set to some degree. The opening size θasx is set such that the side lobe can also be used for projection. A point source is assumed as the light source 11. On the surface of the projection-side aperture stop 17 along the direction θy, the spread of the light component passing through a pixel can be represented by a spread angle θmwy (half-angle value) of the main lobe as follows:

$$\theta mwy = \arctan(\lambda/Wy) \quad (13)$$

λ: the wavelength of illumination light

Wy: the width of the pixel of the spatial light modulation device along the direction perpendicular to the direction of complex amplitude modulation in the pixel A spread angle θLy of the illumination light is further taken into consideration. To effectively use the light for illuminating the diffraction type spatial light modulation device 15 for projection, θasy is defined such that inequality (14) below is satisfied:

$$\theta Ly + \theta mwy \leq \theta asy$$

i.e., $$\theta Ly + \arctan(\lambda/wy) \leq \theta asy \quad (14)$$

If the equal sign holds in equation (14), the main lobe completely falls within the opening of the projection-side aperture stop 17, so that the light emitted from the light source 11 can be effectively used for projection. If the inequality sign holds in equation (14), the side lobe also falls within the opening of the projection-side aperture stop 17, so that brighter display is enabled.

Figures 12A, 12B:
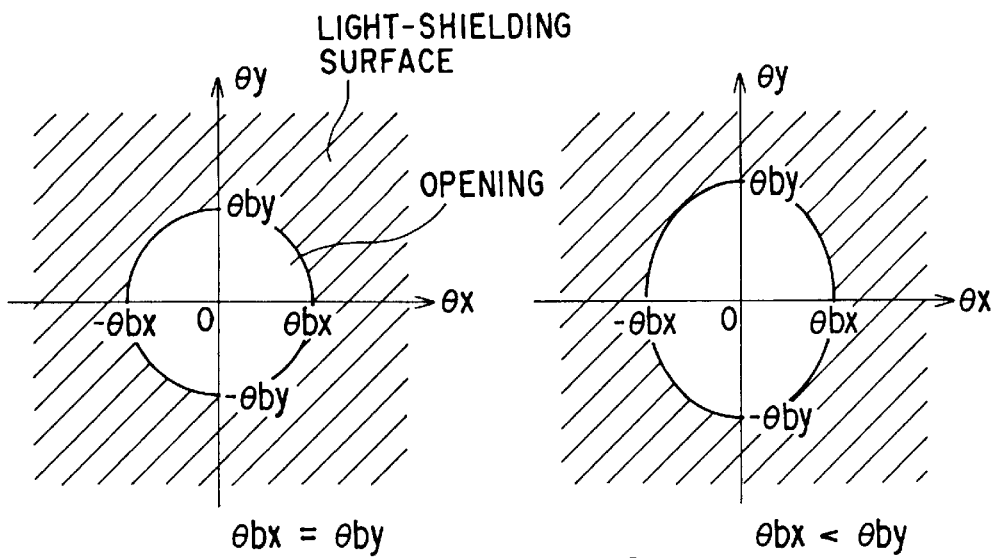
FIGS. 12A to 12E are views showing the specific shapes of the light source-side aperture stop and the projection-side aperture stop used in the first embodiment.
Figures 12C, 12D:
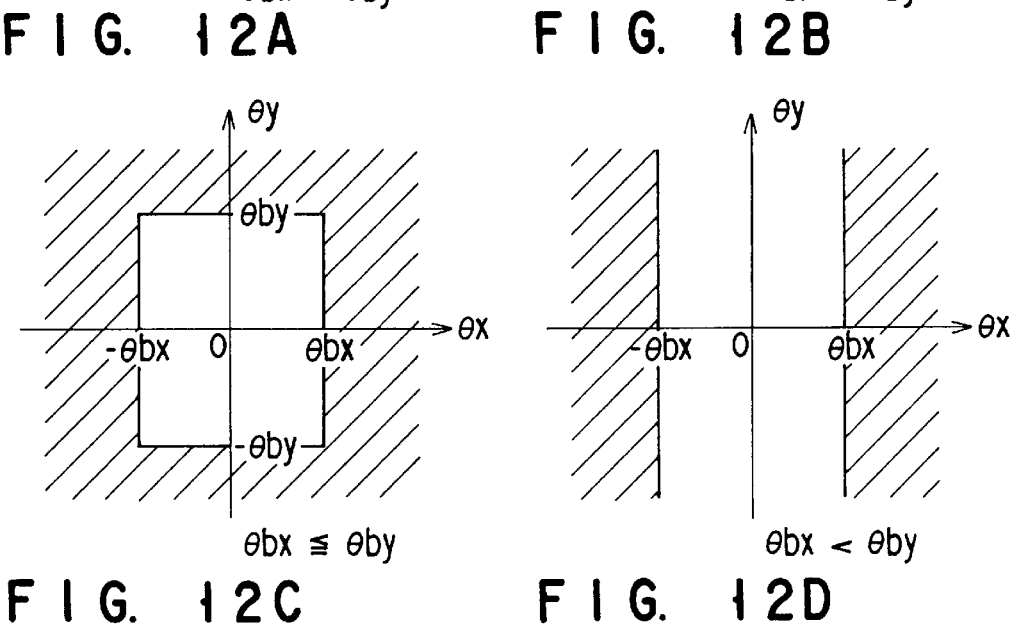
Figure 12E:
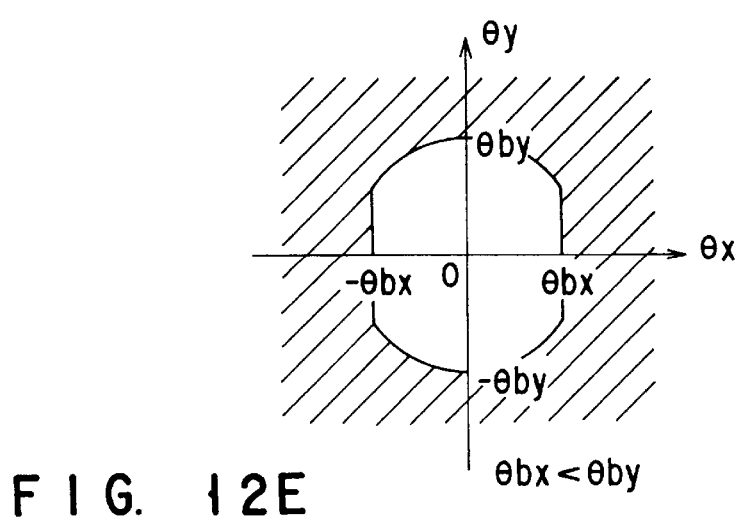

FIGS. 12A to 12E are views showing the specific shapes of the light source-side aperture stop 13 or the projection-side aperture stop 17. In FIGS. 12A to 12E, the coordinates of the boundary between the opening and the light-shielding surface are set as θbx and θby along the directions θx and θy, respectively. For the light source-side aperture stop 13, θLx and θLy may replace θbx and θby, respectively. For the projection-side aperture stop 17, θasx and θasy may replace θbx and θby, respectively. As the opening shape, other than a circular shape shown in FIG. 12A, an elliptical shape shown in FIG. 12B, a rectangular shape shown in FIG. 12C, a slit-like shape shown in FIG. 12D, or a shape obtained by slicing part of a circle as shown in FIG. 12E is effectively used.

In the dark field projection optical system, as the projection-side light beam limiting device, a light-shielding plate having a shape obtained by inverting the shape of the light source-side aperture stop 13 shown in FIGS. 12A to 12E, i.e., a light-shielding plate shown in one of FIGS. 13A to 13E in which the opening portions in FIGS. 12A to 12E are replaced with light-shielding surfaces is used. With this arrangement, the same effect as described above can be obtained.

Finally, the numerical example of the present invention will be indicated. Table 3 shows the first numerical example as a setting example along the direction θx.

TABLE 2

| | |
|---|---|
| Spatial period p of complex amplitude modulation | 8 μm |
| Pixel width Wx in the direction x | 32 μm |
| Opening half-width θasx of the projection-side aperture stop | 2.0° |
| Maximum incident angle θLx of illumination light | 1.0° |

Table 4 shows the relationships between the respective above-described conditions and the numerical values of the first numerical example.

TABLE 4

| | B & W | R | G | B |
|---|---|---|---|---|
| Center wavelength λ of projection light | 0.55 | 0.65 | 0.54 | 0.47 |
| θasx/arcsin (λ/p) | 0.50 | 0.42 | 0.51 | 0.59 |
| (θLx/arctant (λ/Wx))/θasx | 1.00 | 1.10 | 1.00 | 0.93 |

In this case, the center wavelength of projection light, i.e., light for illuminating the diffraction type spatial light modulation device 15 is assumed to be 0.55 (μm) for black and white display (B&W). Actually, the conditions change for the respective colors, i.e., R (red), G (green), and B (blue). However, as shown in Table 4, even when the conditions are compared in consideration of the center wavelength for each color, the evaluation value of each condition does not so largely deviate from the center value and can be considered to sufficiently fall within the allowance.

When, in the first numerical example shown in Table 3, the arrangement shown in FIG. 2 is used as the diffraction type spatial light modulation device 15, the spatial period pd of the finger portions of the transparent interdigital electrode 22 corresponds to the period p of phase modulation of light, as described above. Therefore, the spatial period pd may be set to be 8 (μm). At this time, the width of the finger portion may be ½ the period, i.e., about 4 (μm). The conventional manufacturing technique can sufficiently cope with these numerical values.

Table 5 shows the second numerical example in which the allowable value of the maximum incident angle of illumination light is set to be larger than that of the first numerical example shown in Table 3:

TABLE 5

| | |
|---|---|
| Spatial period p of complex amplitude modulation | 4 μm |
| Pixel width Wx in the direction x | 32 μm |
| Opening half-width θasx of the projection-side aperture stop | 4.0° |
| Maximum incident angle θLx of illumination light | 3.0° |

In the second numerical example, since the period of complex amplitude modulation is small, a technique of realizing this period with an electrode having a large line width or a micropatterning technique is required. However, the allowance of the maximum incident angle of illumination light can be set to be large. Therefore, light emitted from even a light source having a large light-emitting point can be effectively used for projection, so that brighter display is enabled.

Table 6 shows the third numerical example in which the allowable value of the maximum incident angle of illumination light is set to be larger than that of the first numerical example shown in Table 3:

TABLE 6

| | |
|---|---|
| Spatial period p of complex amplitude modulation | 8 μm |
| Pixel width Wx in the direction x | 96 μm |
| Opening half-width θasx of the projection-side aperture stop | 2.0° |
| Maximum incident angle θLx of illumination light | 1.5° |

The third numerical example was used in the above-described simulation. In this numerical example, since the pixel is large, the size of the light modulation device as a whole also increases. However, the allowance of the maximum incident angle of illumination light can be advantageously set to be large without using any micropatterning technique.

Table 7 shows a setting example along the direction θy:

TABLE 7

| | |
|---|---|
| Pixel width Wy in the direction y | 30 μm |
| Opening half-width θasy of the projection-side aperture stop | 7.0° |
| Maximum incident angle θLy of illumination light | 5.0° |

For this setting, it is assumed that a metal halide lamp having an arc length of 5 mm is used as the light source 11, and a mirror having the shape of an ellipsoid of revolution and the focal lengths fr1=20 mm and fr2=100 mm is used as the reflecting mirror 12.

When illumination light which satisfies these conditions is used, the radius RL of a region where the light energy substantially concentrates on the surface of the light source-side aperture stop 13 becomes about 15 mm. This value can be converted into θLr of 4.3 (deg). In comparison with θLx in the first and second numerical examples, θLr is larger than θLx. The maximum incident angle θLy is set to be much larger. The opening half-width θasx is set on the basis of θLy and Wy to satisfy the above-described condition.

As described above, in the projection display apparatus of the present invention, by appropriately setting the relationship between the spatial period of complex amplitude modulation of light in the pixel of the diffraction type spatial light modulation device and the size of the projection-side aperture stop, the margin for the spread of light for illuminating the spatial light modulation device can be maximized while maintaining a high display contrast. When the relationships between the opening size of the projection-side aperture stop and the pixel width of the spatial light modulation device and the maximum incident angle of light for illuminating the spatial light modulation device are limited, light at the maximum incident angle within the allowance can be used for projection without degrading the contrast of the display image, so that a bright image can be displayed.

In the above description of the first embodiment, the opening size of the projection-side aperture stop is set in accordance with the spatial period of complex amplitude modulation in the pixel of the spatial light modulation device, and then the opening size of the light source-side aperture stop is set. However, the order of setting the parameters may be changed because, in the present invention, definitions of the relationships between the respective parameters are important. When the spatial period of complex amplitude modulation of light in the pixel can be relatively freely set, the pixel size or the spatial period of complex amplitude modulation of light can be set with reference to the size of the light-source side stop.

In the above description, the light source-side aperture stop is used as a device for defining the maximum incident angle of illumination light on the spatial light modulation device, though this device is not essential. The edge for defining the effective diameter of the optical element of the illumination system sometimes plays the role of the light source-side aperture stop, or the size of the light-emitting point of the light source itself defines the maximum incident angle of illumination light in some cases. In such a case as well, the present invention can be effectively applied.

Second Embodiment

The preferred embodiment of a spatial light modulation device according to the present invention will be described below.

Figure 14:
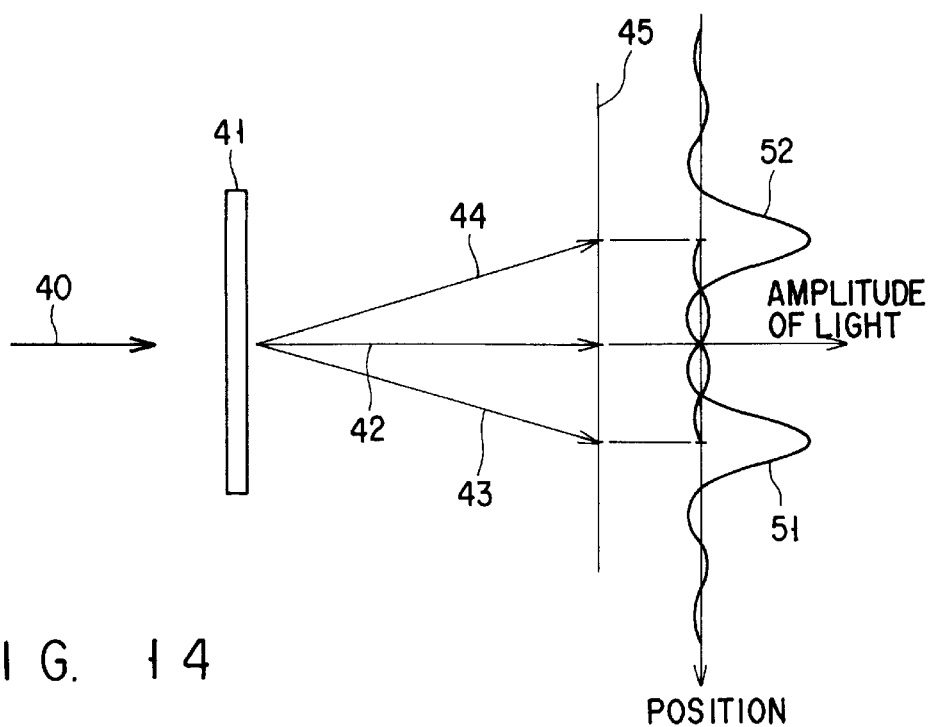
FIG. 14 is a view schematically showing the state of light diffracted by a spatial light modulation device according to the second embodiment of the present invention.

FIG. 14 is an explanatory view of the principle of the spatial light modulation device according to this embodiment. When a light beam 40 emitted from a light source (not shown) is incident on a spatial light modulation device 41, a 0th-order diffracted light component 42 and ±1st-order diffracted light components 43 and 44 of light emerging from the spatial light modulation device 41 reach a screen 45. In this embodiment, as indicated by the amplitude distributions of the ±1st-order diffracted light components 43 and 44 on the screen 45 on the right side of FIG. 14, the complex amplitude modulation pattern in each pixel of the spatial light modulation device 41 is set such that the +1st-order diffracted light component 43 and the −1st-order diffracted light 44 component mutually reduce the intensities in a region where the 0th-order diffracted light component 42 is present. This point will be described below in detail.

The relationship between the pixel structure of the spatial light modulation device 41 and the phase difference between the ±1st-order diffracted light components 43 and 44 will be described first in detail. Assume that sine wave complex amplitude modulation is performed in a pixel having a width Wx and located on the optical axis. For the descriptive convenience, the light source is assumed to be a point source. When the period of a sine wave which is assumed as a complex amplitude modulation pattern is represented by Λ, and the initial phase is represented by φ, a complex amplitude distribution waveform f(x) of light passing he pixel can be represented by equation (15) below:

$$f(x) = rect\left(\frac{x}{Wx}\right)\sin\left(\frac{2\pi}{\Lambda}(X - \phi)\right) \tag{15}$$

The rect and sinc functions are defined by equations (16) and (17) below, respectively.

$$rect\left(\frac{x}{Wx}\right) = \begin{cases} 1, & -\frac{Wx}{2} \leq x \leq \frac{Wx}{2} \\ 0, & \text{otherwise} \end{cases} \tag{16}$$

$$sinc(x) = \frac{\sin(\pi x)}{\pi x} \tag{17}$$

Propagation of this light to the surface of the projection-side aperture (not shown) can be approximated by Fraunhofer diffraction, so that an amplitude distribution h(f(x)) of light on the surface of the projection side stop is represented by equation (18) below:

$$\begin{aligned} h(f(x)) &= F\{f(x)\} \\ &= F\left\{rect\left(\frac{x}{Wx}\right)\right\} * F\left\{\sin\left(\frac{2\pi}{\Lambda}(x - \phi)\right)\right\} \\ \alpha Wx\mathrm{sinc}(Wxfx) &* \frac{1}{2}\left\{\exp\left(-j\left(\frac{\pi}{2} + \phi\right)\right)\delta\left(fx - \frac{1}{\Lambda}\right) + \right. \\ &\left. \exp\left(j\left(\frac{\pi}{2} + \phi\right)\right)\delta\left(fx + \frac{1}{\Lambda}\right)\right\} \end{aligned} \tag{18}$$

where F{f(x)} represents Fourier transform of f(x); *, the convolution integral; and j, the imaginary unit.

As is apparent from equation (18), the +1st-order diffracted light components 43 and 44 have main lobes having a width of 2/Wx at positions defined by fx=±1/p, respectively, and the phase difference between the ±1st-order diffracted light components 43 and 44 is π+2φ.

Figure 15A:
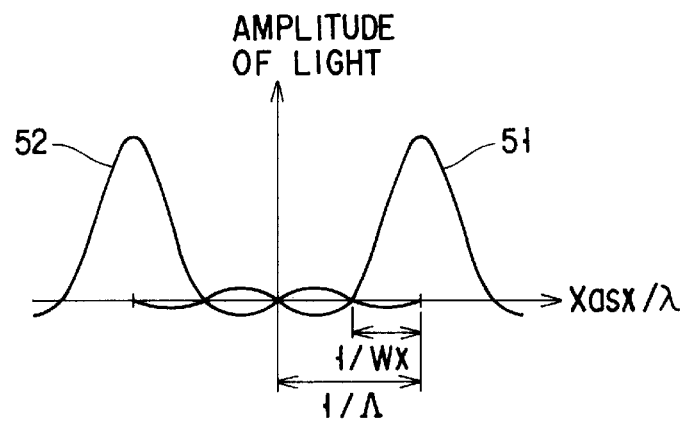
FIGS. 15A and 15B are graphs showing examples of an amplitude distribution, in a far field, of light diffracted by the spatial light modulation device according to the second embodiment.
Figure 16A:
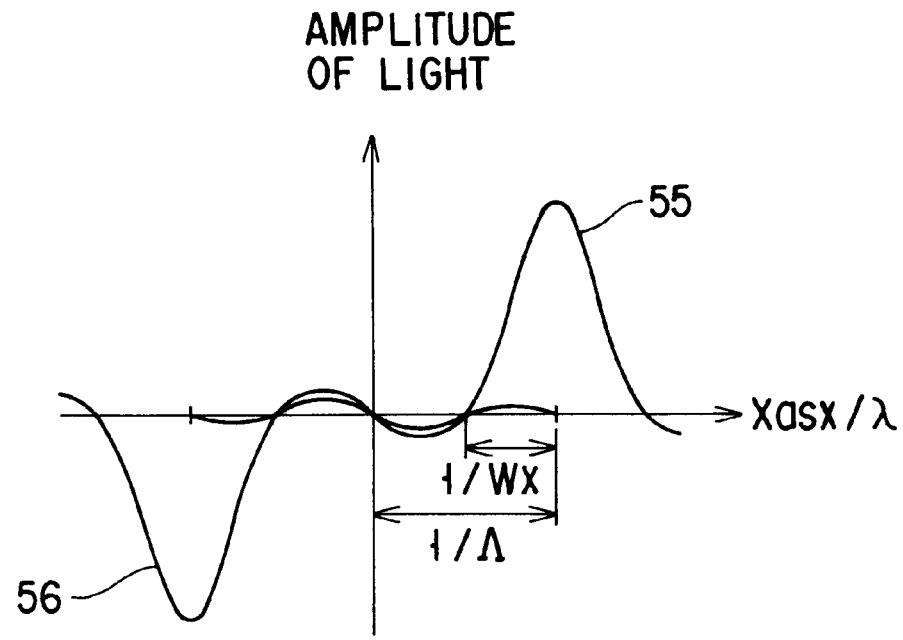
FIGS. 16A and 16B are graphs showing examples of the amplitude distribution, in the far field, of the light diffracted by a spatial light modulation device which does not satisfy the conditions of the present invention.

Consider a case in which the effective opening width of the pixel is an integer multiple of the spatial period of complex amplitude modulation in the pixel, i.e., Wx=nΛ (n is an integer: n=2 is particularly assumed in the following description). In this case, a distribution as shown in FIGS. 15A or 16A is obtained as the distribution of diffracted light on the surface of the projection-side aperture stop. FIG. 15A shows a distribution observed when the complex amplitude modulation pattern is symmetric in the pixel, e.g., when φ=π/2. FIG. 16A shows a distribution observed when the complex amplitude modulation pattern is shifted by ¼ the modulation period from the position where the pattern is symmetric in the pixel (particularly when the complex amplitude modulation pattern becomes anti-symmetric to a specific complex amplitude modulation pattern in the pixel), e.g., when φ=0.

As is apparent from FIGS. 15A and 16A, when the effective opening width of the pixel of the spatial light modulation device is an integer multiple of the spatial period of complex amplitude modulation in the pixel, and the pixel has a structure in which the complex amplitude modulation pattern becomes symmetric in the opening of the pixel on the basis of the present invention, as shown in FIG. 15A, the signs of the amplitudes of the ±1st-order diffracted light components are reversed near the optical axis, and the ±1st-order diffracted light components mutually reduce the intensities to sufficiently darken the light near the optical axis center. Inversely, when the complex amplitude modulation pattern is shifted, as shown in FIG. 16A, the signs of the amplitudes of the ±1st-order diffracted light components coincide with each other to mutually increase the intensities, so the light near the optical axis center is not sufficiently darkened.

Figure 16B:
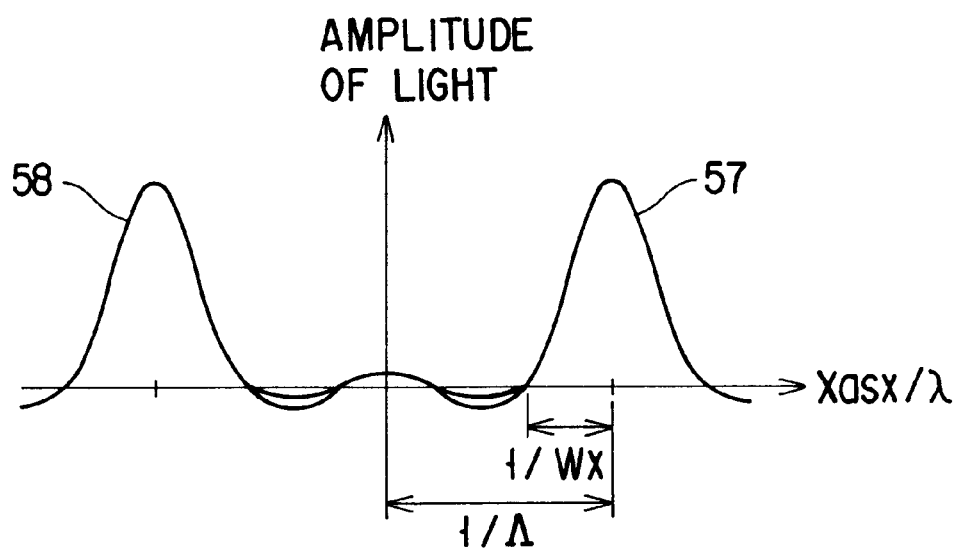

Consider a case in which the effective opening width of the pixel is an odd multiple of ½ the spatial period of complex amplitude modulation in the pixel, i.e., Wx=(n−½)Λ (n is an integer: particularly n=2 is assumed in the following description). In this case, a distribution as shown in FIGS. 15A or 16B is obtained as the distribution of diffracted light on the surface of the projection-side aperture stop. FIG. 16B shows a distribution observed when the complex amplitude modulation pattern is symmetric in the pixel, e.g., when φ=π/2. FIG. 15A shows a distribution observed when the complex amplitude modulation pattern is shifted by ¼ the modulation period from the position where the pattern is symmetric in the pixel (particularly when the complex amplitude modulation pattern becomes anti-symmetric to a specific complex amplitude modulation pattern in the pixel), e.g., when φ=0.

Figure 15B:
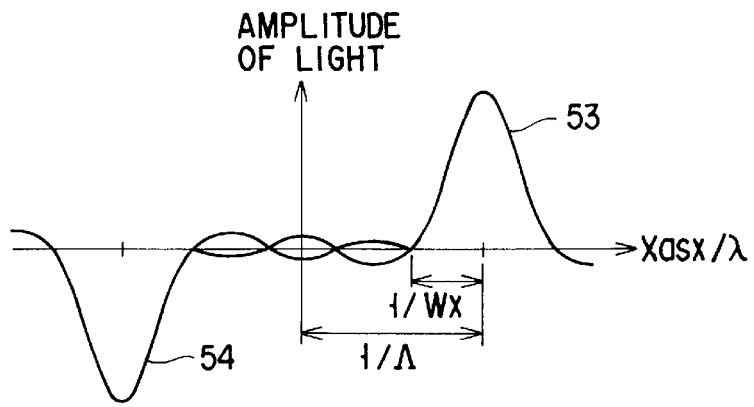

As is apparent from FIGS. 15B and 16B, when the effective opening width of the pixel of the spatial light modulation device is an odd multiple of ½ the spatial period of complex amplitude modulation of light in the pixel, and the pixel has a structure in which the complex amplitude modulation pattern is shifted by ¼ the modulation period from the position where the pattern is symmetric in the opening of the pixel on the basis of the present invention, as shown in FIG. 15B (particularly, the complex amplitude modulation pattern is anti-symmetric to a specific complex amplitude pattern in the pixel), the ±1st-order diffracted light components mutually reduce the intensities to sufficiently darken the light near the optical axis. Inversely, when the complex amplitude modulation pattern is symmetric in the pixel, as shown in FIG. 16B, the signs of the amplitudes of the ±1st-order diffracted light components coincide with each other to mutually increase the intensities, so the light near the optical axis center is not sufficiently darkened.

According to this embodiment, for the diffraction pattern of light subjected to complex amplitude modulation in the pixel of the spatial light modulation device 41 and reaching the surface of the aperture stop, the light intensity near the optical axis is sufficiently reduced. With this arrangement, the black level in the use of the bright field projection optical system can be sufficiently lowered, and a high contrast can be ensured.

Specific examples of the complex amplitude modulation pattern in the pixel of the spatial light modulation device of the present invention will be described below. In the following drawing showing the examples, a sectional pattern taken along the modulation direction of the complex amplitude distribution of light which is transmitted through a pixel when a plane wave having a uniform light intensity distribution is incident on the pixel. As for the direction of depth in the figure, the same complex amplitude modulation pattern as shown in the figure continues to the end of the pixel without any influence of a device such as a TFT for limiting the opening.

Figure 17A:
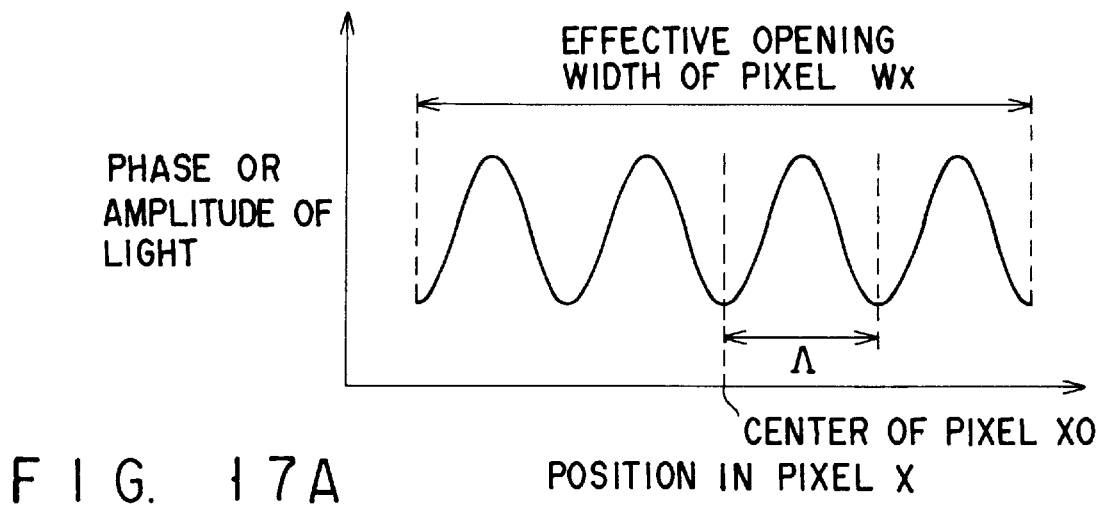
FIGS. 17A to 17C are graphs showing the first example of phase or amplitude modulation of light by a pixel.
Figure 17B:
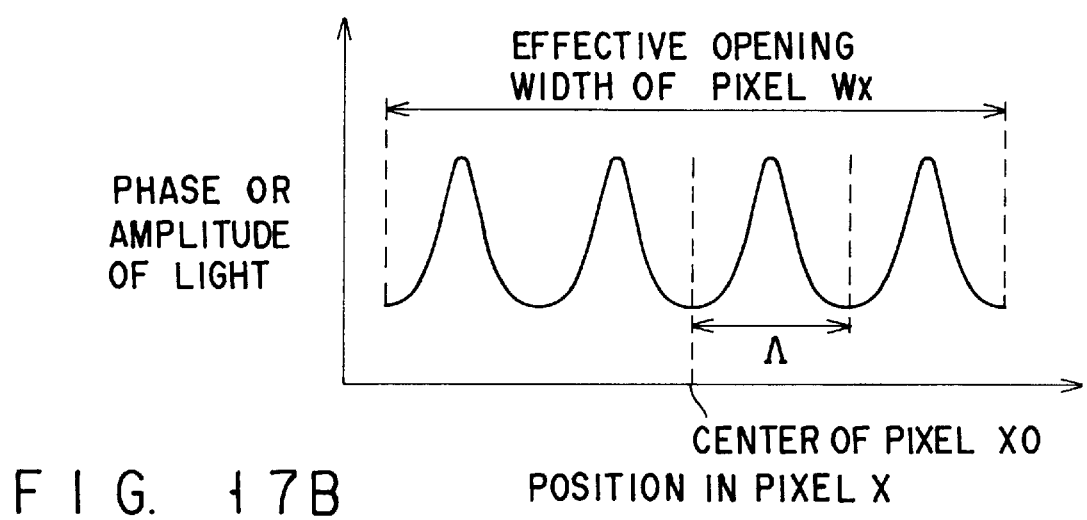
Figure 17C:
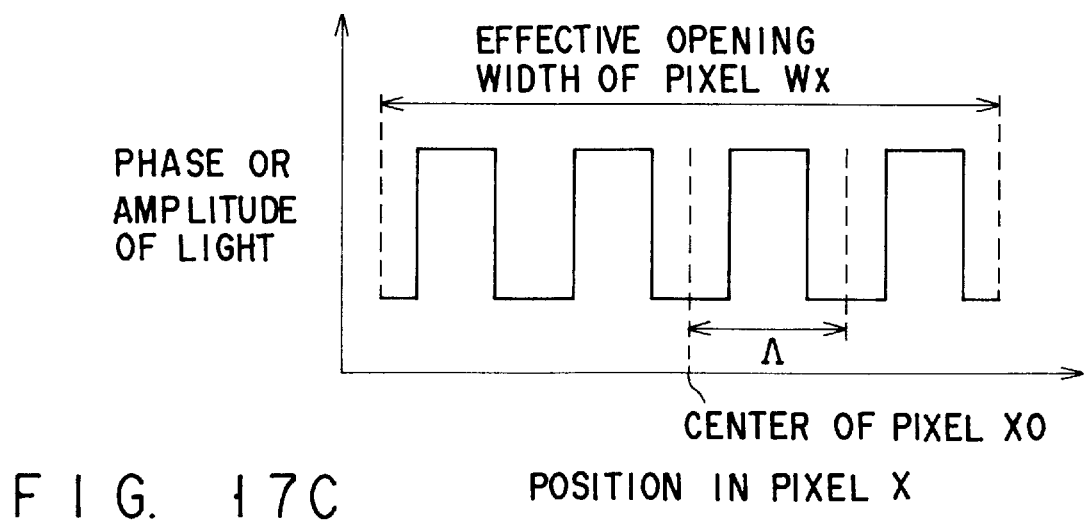

FIGS. 17A to 17C are graphs showing the first example of the complex amplitude modulation pattern. In this example, the effective opening width of one pixel is an integer multiple (four times in this example) of the period Λ of the complex amplitude modulation pattern, and the complex amplitude modulation pattern is symmetric in the pixel. Particularly, FIG. 17A shows a complex amplitude modulation pattern using sine wave amplitude modulation or phase modulation. FIG. 17B shows a pattern whose sine wave is distorted, and FIG. 17C shows a pattern using a rectangular wave.

Figure 18:
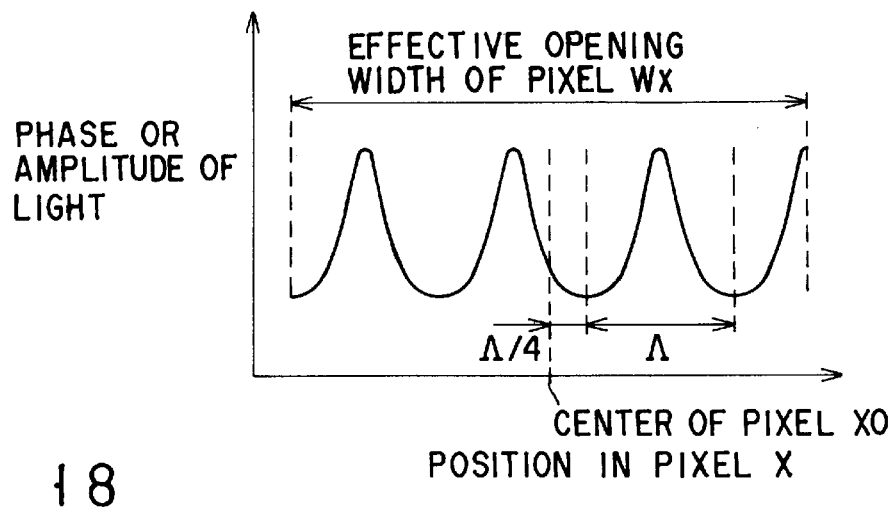
FIG. 18 is a graph showing the second example of phase or amplitude modulation of light by a pixel.

FIG. 18 is a graph showing the second example of the complex amplitude modulation pattern. In this example, the effective opening width of one pixel is an odd multiple (seven times in this example) of ½ the period Λ of the complex amplitude modulation pattern, and the complex amplitude modulation pattern is shifted by ¼ the modulation period Λ in the modulation direction from the position where the pattern is symmetric in the pixel.

Figure 19A:
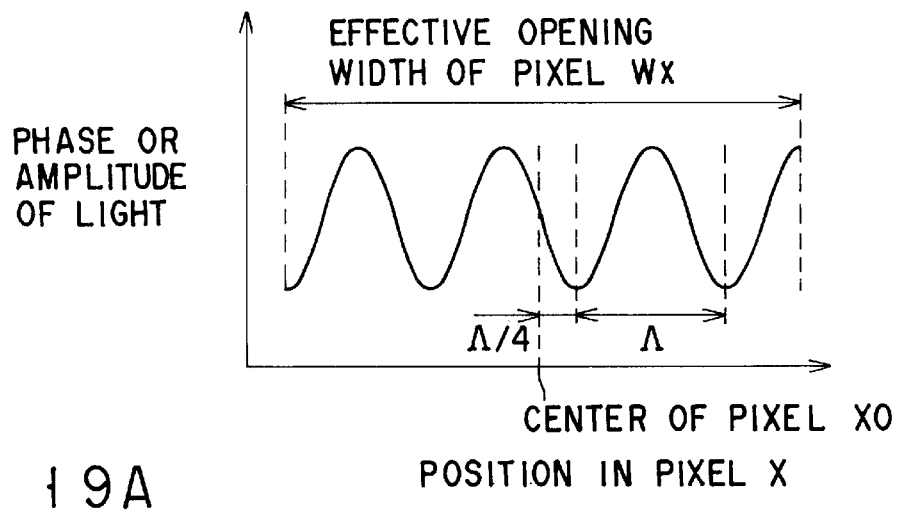
FIGS. 19A and 19B are graphs showing the third example of phase or amplitude modulation of light by a pixel.
Figure 19B:
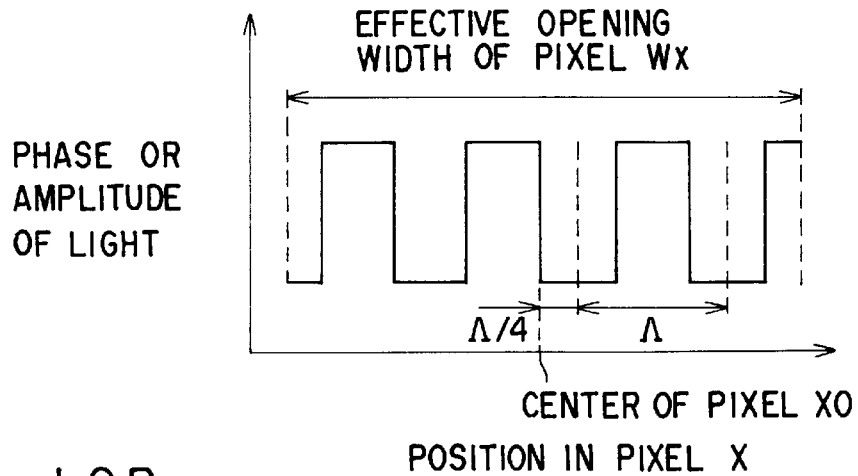

FIGS. 19A and 19B are graphs showing the third example of the complex amplitude modulation pattern. In the present invention, when an anti-symmetric pattern can be formed as a pattern for one period of the modulation waveform, the effective opening width of one pixel may be set to be an odd multiple (seven times in this example) of ½ the period ζ of the complex amplitude modulation pattern, and the complex amplitude modulation pattern may be set to be anti-symmetric in the pixel.

Figure 20A:
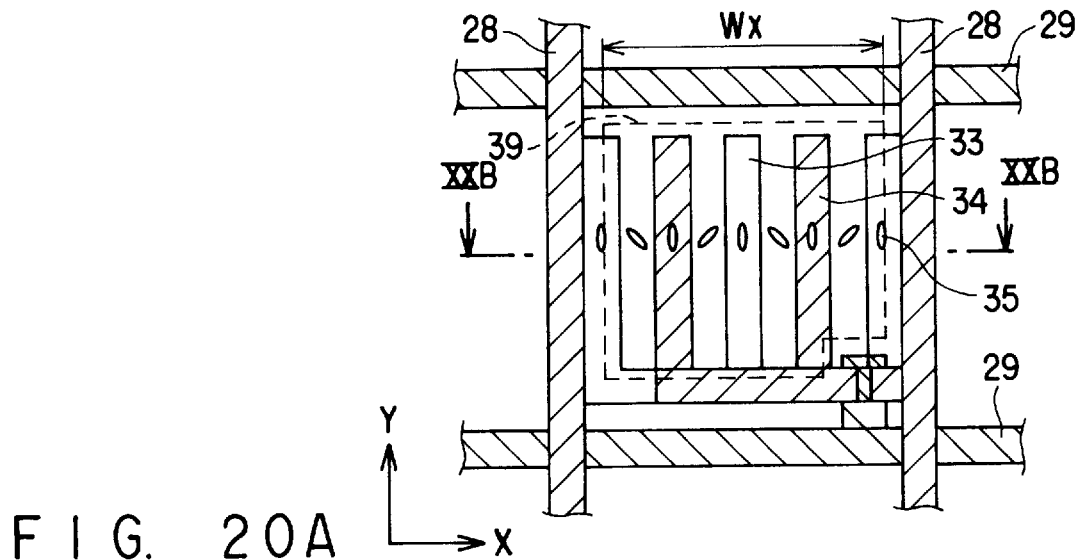
FIG. 20A is a plan view showing the structure of a pixel of the spatial light modulation device according to the second embodiment.
Figure 20B:
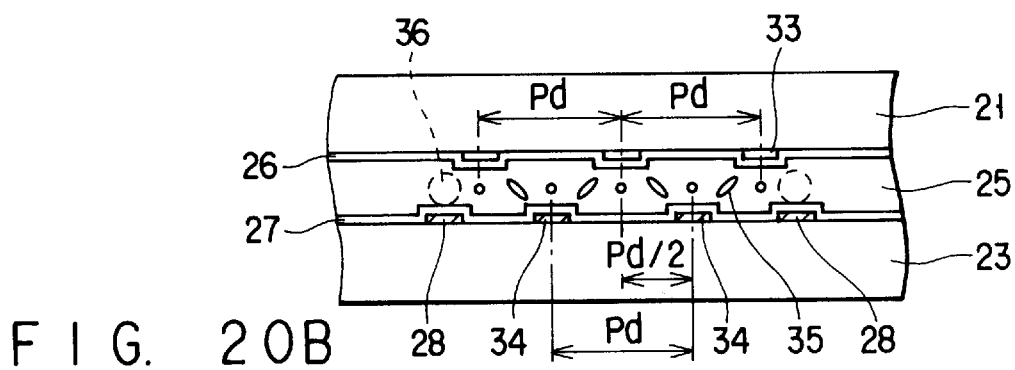
FIG. 20B is a sectional view showing the structure of the pixel.
Figure 20C:
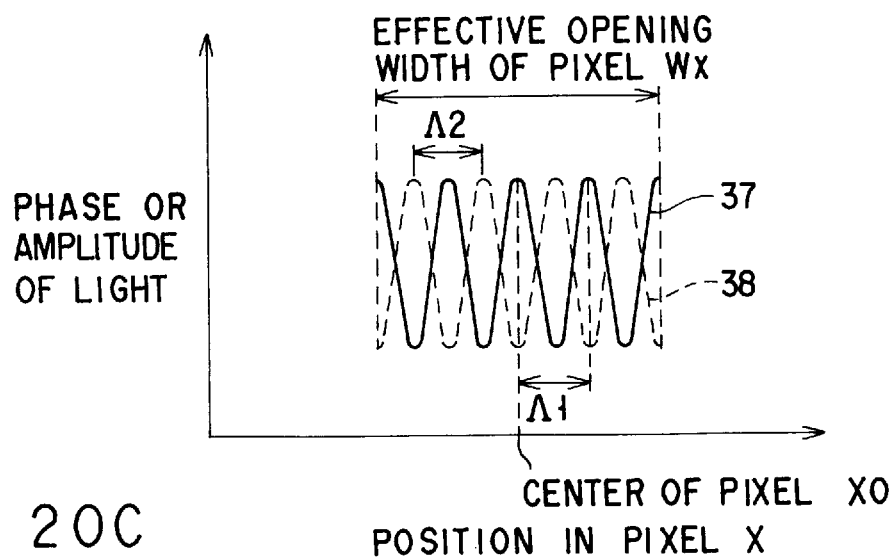
FIG. 20C is a graph showing the complex amplitude of light transmitted through the pixel.

FIGS. 20A to 20C are views showing the structure of the spatial light modulation device for realizing the above-described complex amplitude modulation pattern. FIGS. 20A and 20B are plan and sectional views showing the structure of one pixel. FIG. 20C is a graph showing complex amplitude modulation of light in the pixel. Note that the equivalent circuit diagram of this spatial light modulation device is the same as FIG. 4C.

This spatial light modulation device basically has the same structure as that of the device shown in FIGS. 4A to 4C in which a liquid crystal layer 25 is sandwiched between two substrates each having a transparent electrode formed thereon. This device is different from that shown in FIGS. 4A to 4C in the structure of the electrode. A transparent electrode 33 formed on a first substrate 21 and a transparent electrode 34 formed on a second substrate 23 are transparent interdigital electrodes. The finger portions of the electrodes 33 and 34 are alternate. When the effective opening width Wx of a pixel 31 is 32 μm, the period Pd of the finger portions is 16 μm. The upper and lower electrodes overlap while being shifted by 8 μm. The state-of-the-art technique can sufficiently cope with this precision. Transparent alignment layers 26 and 27 are formed between the liquid crystal layer 25 and the substrates 21 and 23, respectively.

Data lines 28 are formed on the first substrate 21 along the direction x, and scanning lines 29 are formed on the first substrate 21 along the direction y, as in FIGS. 4A to 4C. A TFT (Thin Film Transistor) is also formed on the first substrate 21. The gate electrode of the TFT is connected to the data line 28, and the source electrode of the TFT is connected to the scanning line 29. The drain electrode of the TFT is connected to the pixel 31 constituted by the transparent interdigital electrode 33, the liquid crystal layer 25, and the transparent interdigital electrode 34, and a capacitor (not shown). A voltage corresponding to a pixel signal is applied to the data line 28, and a scanning voltage is sequentially applied to the scanning lines 29.

When no voltage is applied between the transparent interdigital electrodes 33 and 34 through the data line and the scanning line 29, all the liquid crystal molecules in the liquid crystal layer 25 are aligned in one direction, i.e., in a direction parallel to the fingers, so that the pixel 31 optically seems a flat plate. When a voltage is applied between the transparent interdigital electrodes 33 and 34, strong electric fields are generated in regions between the fingers of the electrodes 33 and 34, and the liquid crystal molecules are aligned along the electric fields. Immediately above or below the fingers of the electrodes 33 and 34, the influence of the electric fields is small, so the alignment of the liquid crystal molecules hardly changes. With this arrangement, the alignment of liquid crystal molecules as shown in FIGS. 20A and 20B is realized.

When, for the material used for the liquid crystal layer 25, the refractive index (Ne) in the longitudinal direction of a molecule is higher than the refractive index (No) in a direction perpendicular to the longitudinal direction, the refractive index of the pixel 31 seems to periodically change with respect to the polarized light component of light incident on the pixel 31 in the direction x. Therefore, the x-polarized light component transmitted through the pixel 31 exhibits a phase distribution having a periodical structure as indicated by a curve 38 in FIG. 20C. Similarly, the y-polarized light component exhibits a phase distribution having a periodical structure as indicated by a curve 37. That is, a complex amplitude modulation pattern having a phase corresponding to the distribution shown in FIG. 17A can be simultaneously realized for both the x- and y-polarized light components.

In some regions near the pixel 31, the alignment of the liquid crystal molecules become unstable due to the influence of the data lines 28 or the TFT. This region is schematically shown in FIG. 20B as a region 36 where no stable complex amplitude modulation pattern can be obtained. However, with an electrode structure in which the transparent interdigital electrode 33 on the substrate 21 having neither data line 28 nor scanning line 29 is arranged closer to the data line 28 or scanning line 29 than the transparent interdigital electrode 34 on the other substrate 23, this region can be placed outside an effective opening 39 of the pixel 31, so that the influence of unstable modulation can be minimized.

An example in which the spatial light modulation device according to this embodiment is applied to a projection display apparatus having the bright field projection optical system shown in FIG. 2 will be described below. In FIG. 2, a metal halide lamp having an arc length of 3 mm is used as a light source 11, and a mirror having the shape of an ellipsoid of revolution and focal lengths fr1=20 mm and fr2=100 mm is used as a reflecting mirror 12. White light emitted from the light source 11 is temporarily converged by the reflecting mirror 12. The light concentrates on a circular region having a radius of almost 10 mm near the converging position. A light source-side aperture stop 13 is arranged at this position to limit the light beam in a direction within the sheet surface of FIG. 2. The opening size of the light source-side aperture stop 13 is preferably set in accordance with the period p of the complex amplitude modulation pattern in a spatial light modulation device 15. In the above-described example ($\Lambda=Pd/2=8$ μm), the opening size of the light source-side aperture stop 13 is preferably set such that a maximum incident angle $\theta Lx$ of illumination light on the spatial light modulation device 15 becomes 1.0°.

The illumination light whose opening is limited by the light source-side aperture stop 13 is collimated by a collimator lens 14 into an almost parallel beam and incident on the spatial light modulation device 15 as illumination light. A plano-convex lens having a focal length fc of about 200 mm is used as the collimator lens 14.

As the spatial light modulation device 15, a device having a structure in which a width Wx of the effective opening 39 of the pixel 31 is 32 μm, as described above, sine wave phase modulation having a period λ of 8 μm is performed in the pixel 31, and the complex amplitude modulation pattern is symmetric in the effective opening 39 of the pixel 31 is used.

Of the light incident on the pixels 31 of the spatial light modulation device 15, a light component incident on an ON pixel to which a voltage is applied is subjected to periodical phase modulation and largely diffracted in a predetermined direction, and a light component incident on an OFF pixel passes through the pixel. These light components are converged by a condenser lens 16 to form, on the converging plane, the Fraunhofer diffraction pattern of the spatial light modulation device 15. A projection-side aperture stop 17 is arranged on the converging plane of the condenser lens 16. The light component diffracted by the ON pixel is shielded, and the light component passing through the OFF pixel is projected onto a screen 19, thereby displaying an image with a contrast.

When the spatial light modulation device of this embodiment is used, the diffracted light from ON pixel is largely weakened near the optical axis, as described above. Therefore, the ON pixels can be sufficiently darkened, and high-contrast display is enabled. When a predetermined light transmittance of the OFF pixel is to be obtained to ensure the brightness of the image, and simultaneously, the ON pixel is to be darkened, the opening size of the projection-side aperture stop 17 may be set such that a half angle $\theta asx$ of a lead angle obtained by viewing the opening portion from the position of the condenser lens 16 becomes about 2.0°.

The result of computer simulation for estimating the contrast obtained by the projection display apparatus of this embodiment will be described next.

To simplify the calculation in simulation, a circular distribution having a uniform intensity was assumed as a light intensity distribution on the surface of the light source-side aperture stop 13. For the radius of the circle, it was assumed that the lead angle ($\theta Lr$) viewed from the position of the collimator lens 14 was 3°. In addition, light having a single wavelength was assumed as representative light emitted from the light source 11. Table 8 shows conditions such as the maximum incident angle of illumination light on the spatial light modulation device 15, setting of the pixel, the projection-side aperture stop 17, and the like.

TABLE 8

| | |
|---|---|
| Spatial period Λ of complex amplitude modulation | 8 μm |
| Pixel width Wx in the direction x | 96 μm |
| Maximum incident angle $\theta Lx$ of illumination light | 1.48° |
| Wavelength λ of illumination light | 0.55 μm |
| Opening half-width $\theta asx$ of the projection-side aperture stop | 1.48° |

In Table 8, the maximum incident angle $\theta Lx$ of illumination light and the opening size $\theta asx$ of the projection-side aperture stop 17 are angles in the direction parallel to the sheet surface. The direction x on the surface of the spatial light modulation device in FIGS. 20A to 20C is present within the sheet surface of FIG. 2.

FIG. 21 is a graph showing the contrast calculation result. The abscissa represents the maximum amplitude of phase modulation in the pixel, and the ordinate represents the contrast. A solid line 71 in FIG. 21 indicates the result of calculation with setting for satisfying the above-described conditions of the present invention. A broken line 72 indicates the result of calculation basically using the same setting, which is obtained when the spatial phase (position) of the complex amplitude modulation pattern is shifted to be anti-symmetric in the pixel (when the conditions of the present invention are not satisfied).

As is apparent from this result, when the maximum amplitude of phase modulation is set to be about 0.38, the contrast can be maximized. However, in comparing the solid line 71 according to the present invention with the broken line 72 not related to the present invention, a large difference is generated between the resultant contrasts. Generally, the contrast must be 100 or more, and preferably, 200 or more. If the conditions of the present invention are not satisfied, the resultant contrast is as low as about 50, and sufficient performance cannot be obtained. If the conditions of the present invention are satisfied, a contrast as high as about 380 can be obtained.

As described above, in the spatial light modulation device 15 and the projection display apparatus according to this embodiment, the relationship between the effective opening width of the pixel of the spatial light modulation device and the spatial period of complex amplitude modulation of light, and the position of the complex amplitude modulation pattern of light in the pixel are appropriately set. With this arrangement, the intensity of diffracted light from the ON pixel can be sufficiently decreased near the optical axis, so that display having a high contrast can be realized using the bright field projection optical system as shown in FIG. 2. Therefore, an inexpensive projection display apparatus having a high contrast can be realized.

Although the specific structure of the pixel of the spatial light modulation device has also been described in this embodiment, another specific means for generating the complex amplitude modulation pattern may be used because the gist of the present invention is to define the characteristic features of the complex amplitude modulation pattern. More specifically, the number or shape of fingers of the interdigital electrode may be changed, and the shape of the electrode need not be interdigital. As the spatial light modulation device, any one of a transmission type device as shown in this embodiment, a reflection type device having a reflecting film formed near one of the two substrates, a device using a liquid crystal for modulation of light, and a device using no liquid crystal may be used. That is, any device can be used as long as the complex amplitude modulation pattern of light transmitted through the spatial light modulation device 15 satisfies the conditions described in this embodiment.

The spatial light modulation device 15 described in this embodiment may have a structure such that one or some of the following various conditions described in the first embodiment are simultaneously satisfied:

$$0.35 < \theta asx/\arcsin(\lambda/p) < 0.6$$

$$0.8 < \theta Lx + \arctan(\lambda/Wx) < \theta asx < 1.3$$

$$\theta asx \leq \theta asy$$

$$\theta Lx \leq \theta Ly$$

$$\theta Ly + \arctan(\lambda/Wy) \leq \theta asx$$

As has been described above, according to the present invention, the relationship between the spatial period of complex amplitude modulation of light in the pixel of the diffraction type spatial light modulation device and the opening size of the aperture stop or the size of the light-shielding surface of the light-shielding plate, which constitutes the projection side light beam limiting device, or the maximum incident angle of light for illuminating the spatial light modulation device is optimized. With this arrangement, when a light source and a spatial light modulation device which are actually usable for the projection display apparatus are used, sufficient brightness can be ensured without degrading the contrast of the displayed image.

In addition, according to the spatial light modulation device of the present invention, the complex amplitude modulation pattern in each pixel is set such that the 1st-order diffracted light component and the −1st-order diffracted light component of light which emerges upon incidence of a light beam mutually reduce the intensities near a region where the 0th-order light component is present. With this arrangement, high-contrast display can be realized using the bright field projection optical system. Therefore, an inexpensive projection display apparatus capable of high-contrast and bright display can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A projection display apparatus comprising:

a light source for emitting illumination light;

a spatial light modulation device having a plurality of pixels to receive the illumination light emitted from said light source and periodically perform complex amplitude modulation of the incident light in a predetermined direction in each pixel;

a condenser lens coupled to said spatial light modulation device and configured to converge light emerging from said spatial light modulation device;

a projecting lens coupled to said condenser lens and configured to project light from said condenser lens onto a screen; and an aperture stop disposed between said condenser lens and said projecting lens and configured to limit partially the light from said condenser lens to said projecting lens, wherein when a spatial period of complex amplitude modulation in said spatial light modulation device is represented by p, a center wavelength of the incident light is represented by $\lambda$, and a half angle subtended by an area round an opening edge of the aperture stop at the condenser lens along the first direction is represented by $\theta asx$, parameters of said light source, said spatial light modulation device, said condenser lens, and said aperture stop and a relative positional relationship therebetween are defined such that the following condition is satisfied:

$$0.35 < \theta asx/\arcsin(\lambda/p) < 0.6.$$

2. A projection display apparatus comprising:

a light source for emitting illumination light;

a spatial light modulation device having a plurality of pixels to receive the illumination light emitted from said light source and periodically perform complex amplitude modulation of the incident light in a first direction in each pixel;

a projecting lens for projecting light emerging from said spatial light modulation device onto a screen; and an aperture stop associated with said projecting lens to partially limit light from said projecting lens, wherein when a spatial period of complex amplitude modulation in said spatial light modulation device is represented by p', a center wavelength of the incident light is represented by $\lambda'$, and a half angle subtended by an area around an opening edge of the aperture stop at the condenser lens along the first direction is represented by $\theta asx'$, parameters of said light source, said spatial light modulation device, said screen, said aperture stop and said projection lens and a relative positional relationship therebetween are defined such that the following condition is satisfied:

$$0.35 < \theta asx/\arcsin(\lambda'/p') < 0.6.$$

3. An apparatus according to claim 1, wherein, when an effective opening size of each pixel of said spatial light modulation device along the first direction is represented by Wx, and a maximum incident angle of the illumination light incident on said spatial light modulation device along the first direction is represented by θLx, the parameters of said light source, said spatial light modulation device, said condenser lens, said screen, said aperture stop, and said projecting lens and the relative positional relationship therebetween are defined such that the following condition is satisfied:

$$0.8 < \{θLx + \arctan(λ/Wx)\}/θaxs < 1.3.$$

4. An apparatus according to claim 2, wherein, when an effective opening size of each pixel of said spatial light modulation device along the first direction is represented by Wx', and a maximum incident angle of the illumination light incident on said spatial light modulation device along the first direction is represented by θLx, the parameters of said light source, said spatial light modulation device, said screen, said aperture stop and said projecting lens and the relative positional relationship therebetween are defined such that the following condition is satisfied:

$$0.8 < \{θLx' + \arctan(λ'/Wx')\}θaxs < 1.3.$$

5. An apparatus according to claim 3, further comprising:

a second aperture stop provided on a light pass between said light source and said spatial light modulation device, for limiting a maximum incident angle of the illumination light incident on said spatial light modulation device.

6. An apparatus according to claim 4, further comprising:

a second aperture stop provided on a light pass between said light source and said spatial light modulation device, for limiting a maximum incident angle of the illumination light incident on said spatial light modulation device.

7. An apparatus according to claim 1, wherein, when a half angle subtended by an area around an opening edge of the aperture stop at the condenser lens along a second direction perpendicular to the first direction is represented by θasy, the parameters of said light source, said spatial light modulation device, said condenser lens, and said aperture stop and the relative positional relationship therebetween are defined such that the following condition is satisfied:

$$θasx ≦ θasy.$$

8. An apparatus according to claim 2, wherein, when a half angle subtended by an area around an opening edge of the aperture stop at the condenser lens along a second direction perpendicular to the first direction is represented by θasy', the parameters of said light source, said spatial light modulation device, and said aperture stop and the relative positional relationship therebetween are defined such that the following condition is satisfied:

$$θasx' ≦ θasy'.$$

9. An apparatus according to claim 1, wherein, when a maximum incident angle of the illumination light incident on said spatial light modulation device along the first direction is represented by θLx, and a maximum incident angle of the illumination light incident on said spatial light modulation device along a second direction perpendicular to the first direction is represented by θLy, the parameters of said light source, said spatial light modulation device, said condenser lens, and said aperture stop and the relative positional relationship therebetween are defined such that the following condition is satisfied:

$$θLx ≦ θLy.$$

10. An apparatus according to claim 2, wherein, when a maximum incident angle of the illumination light incident on said spatial light modulation device along the first direction is represented by θLx', and a maximum incident angle of the illumination light incident on said spatial light modulation device along a direction perpendicular to the first direction is represented by θLy', the parameters of said light source, said spatial light modulation device, and said aperture stop and the relative positional relationship therebetween are defined such that the following condition is satisfied:

$$θLx' ≦ θLy'.$$

11. An apparatus according to claim 1, wherein, when a size of each pixel of said spatial light modulation device along a second direction perpendicular to the first direction is represented by Wy, a maximum incident angle of the illumination light incident on said spatial light modulation device along the second direction perpendicular to the first direction is represented by θLy, and a half angle subtended by an area around an opening edge of the aperture stop at the condenser lens along the second direction perpendicular to the first direction is represented by θasy, the parameters of said light source, said spatial light modulation device, said condenser lens, and said aperture stop and the relative positional relationship therebetween are defined such that the following condition is satisfied:

$$θLy + \arctan(λ/Wy) ≦ θasy.$$

12. An apparatus according to claim 2, wherein, when a size of each pixel of said spatial light modulation device along a second direction perpendicular to the first direction is represented by Wy', a maximum incident angle of the illumination light incident on said spatial light modulation device along the second direction perpendicular to the first direction is represented by θLy', and a half angle subtended by an area around an opening edge of the aperture stop at the condenser lens along the second direction perpendicular to the first direction is represented by θasy, the parameters of said light source, said spatial light modulation device, and said aperture stop and the relative positional relationship therebetween are defined such that the following condition is satisfied:

$$θLy' + \arctan(λ'/Wy') ≦ θasy'.$$

13. An apparatus according to claim 1, wherein, for said spatial light modulation device, a complex amplitude modulation pattern in each pixel is set such that a 1st-order diffracted light component and a −1st-order diffracted light component of the emerging light mutually reduce intensities near a region where a 0th-order light component is present.

14. An apparatus according to claim 1, wherein, for said spatial light modulation device, an effective opening width of said each pixel along the first direction is an integer multiple of a modulation period, and a complex amplitude modulation pattern in each pixel is symmetric in an opening of said each pixel.

15. An apparatus according to claim 1, wherein, for said spatial light modulation device, an effective opening width of said each pixel along the first direction is an odd multiple of ½ a modulation period, and a complex amplitude modulation pattern in each pixel is shifted by ¼ the modulation period in a predetermined direction from a position where the complex amplitude modulation pattern is symmetric in an opening of said each pixel.

16. An apparatus according to claim 1, wherein, for said spatial light modulation device, an effective opening width of said each pixel along the first direction is an odd multiple of ½ a modulation period, and a complex amplitude modulation pattern in each pixel is anti-symmetric in an opening of said each pixel.

17. An apparatus according to claim 2, wherein, for said spatial light modulation device, a complex amplitude modulation pattern in each pixel is set such that a 1st-order diffracted light component and a −1st-order diffracted light component of the emerging light mutually reduce intensities near a region where a 0th-order light component is present.

18. An apparatus according to claim 2, wherein, for said spatial light modulation device, an effective opening width of said each pixel along the first direction is an integer multiple of a modulation period, and a complex amplitude modulation pattern in each pixel is symmetric in an opening of said each pixel.

19. An apparatus according to claim 2, wherein, for said spatial light modulation device, an effective opening width of said each pixel along the first direction is an odd multiple of ½ a modulation period, and a complex amplitude modulation pattern in each pixel is shifted by ¼ the modulation period in a predetermined direction from a position where the complex amplitude modulation pattern is symmetric in an opening of said each pixel.

20. An apparatus according to claim 2, wherein, for said spatial light modulation device, an effective opening width of said each pixel along the first direction is an odd multiple of ½ a modulation period, and a complex amplitude modulation pattern in each pixel is anti-symmetric in an opening of said each pixel.

21. A spatial light modulation device which has a plurality of pixels and periodically performs complex amplitude modulation of incident light in each pixel along a predetermined direction, wherein a complex amplitude modulation pattern in each pixel is set such that a 1st-order diffracted light component and a −1st-order diffracted light component of emerging light mutually reduce intensities near a region where a 0th-order light component is present.

22. A spatial light modulation device which has a plurality of pixels and periodically performs complex amplitude modulation of incident light in each pixel along a predetermined direction, wherein an effective opening width of said each pixel along the predetermined direction is an integer multiple of a modulation period, and a complex amplitude modulation pattern in each pixel is symmetric in an opening of said each pixel.

23. A spatial light modulation device which has a plurality of pixels and periodically performs complex amplitude modulation of incident light in each pixel along a predetermined direction, wherein an effective opening width of said each pixel along the predetermined direction is an odd multiple of ½ a modulation period, and a complex amplitude modulation pattern in each pixel is shifted by ¼ the modulation period in the predetermined direction from a position where the complex amplitude modulation pattern is symmetric in an opening of said each pixel.

24. A spatial light modulation device which has a plurality of pixels and periodically performs complex amplitude modulation of incident light in each pixel along a predetermined direction, wherein an effective opening width of said each pixel along the predetermined direction is an odd multiple of ½ a modulation period, and a complex amplitude modulation pattern in each pixel is anti-symmetric in an opening of said each pixel.

* * * * *